US011758580B2

(12) United States Patent
Bhattad et al.

(10) Patent No.: US 11,758,580 B2
(45) Date of Patent: Sep. 12, 2023

(54) CHANNEL ACCESS PROCEDURES FOR AN UNLICENSED RADIO FREQUENCY SPECTRUM BAND

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Pravjyot Singh Deogun, Bengaluru (IN); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 16/991,643

(22) Filed: Aug. 12, 2020

(65) Prior Publication Data

US 2021/0051718 A1 Feb. 18, 2021

(30) Foreign Application Priority Data

Aug. 14, 2019 (IN) .............................. 201941032933
Aug. 27, 2019 (IN) .............................. 201941034502

(51) Int. Cl.
*H04W 74/08* (2009.01)
*H04W 74/00* (2009.01)
(Continued)

(52) U.S. Cl.
CPC ... *H04W 74/0808* (2013.01); *H04W 72/0446* (2013.01); *H04W 72/23* (2023.01);
(Continued)

(58) Field of Classification Search
CPC ............. H04W 74/0808; H04W 72/14; H04W 74/0866
See application file for complete search history.

(56) References Cited

U.S. PATENT DOCUMENTS

2017/0135128 A1* 5/2017 Yerramalli .......... H04W 74/006
2017/0238334 A1* 8/2017 Yang ................. H04W 74/0808
370/336
(Continued)

FOREIGN PATENT DOCUMENTS

EP    3355646 A1    8/2018
EP    3355646 A1    8/2018

OTHER PUBLICATIONS

International Search Report and Written Opinion—PCT/US2020/046168—ISA/EPO—dated Dec. 23, 2020.
(Continued)

*Primary Examiner* — Jael M Ulysse
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration that indicates a number of bits to be used in an indication of at least one of a listen-before-talk (LBT) category or a channel access priority class to be used for uplink communications. The UE may receive the indication of at least one of the LBT category or the channel access priority class to be used for a transmission starting point associated with one or more uplink communications, wherein the indication includes the number of bits indicated in the configuration. The UE may perform an LBT procedure for an uplink communication, of the one or more uplink communications, transmitted at the transmission starting point, according to the LBT category or the channel access priority class. Numerous other aspects are provided.

30 Claims, 15 Drawing Sheets

(51) Int. Cl.
*H04W 72/0446* (2023.01)
*H04W 72/23* (2023.01)
*H04W 72/56* (2023.01)

(52) U.S. Cl.
CPC ......... *H04W 72/56* (2023.01); *H04W 74/006* (2013.01); *H04W 74/008* (2013.01)

(56) References Cited

U.S. PATENT DOCUMENTS

| | | | | |
|---|---|---|---|---|
| 2017/0238342 A1* | 8/2017 | Yang | H04W | 74/04 370/329 |
| 2017/0257852 A1* | 9/2017 | Wu | H04L | 1/1854 |
| 2017/0273109 A1* | 9/2017 | Babaei | H04W | 52/42 |
| 2017/0280475 A1* | 9/2017 | Yerramalli | H04W | 72/56 |
| 2018/0042048 A1* | 2/2018 | Hugl | H04W | 72/0446 |
| 2018/0092073 A1* | 3/2018 | Nogami | H04W | 52/16 |
| 2018/0123744 A1* | 5/2018 | Nogami | H04W | 52/248 |
| 2018/0176835 A1* | 6/2018 | Park | H04W | 74/0808 |
| 2018/0191547 A1* | 7/2018 | Mukherjee | H04W | 72/0446 |
| 2018/0288805 A1* | 10/2018 | Bhorkar | H04W | 74/0816 |
| 2018/0352573 A1* | 12/2018 | Yang | H04W | 16/14 |
| 2018/0367282 A1* | 12/2018 | Li | H04W | 72/1268 |
| 2019/0014596 A1* | 1/2019 | Yang | H04W | 72/21 |
| 2019/0053222 A1* | 2/2019 | Bhorkar | H04W | 16/14 |
| 2019/0075592 A1* | 3/2019 | Li | H04W | 16/14 |
| 2019/0098658 A1* | 3/2019 | Noh | H04W | 74/002 |
| 2019/0110307 A1* | 4/2019 | Kim | H04W | 74/0808 |
| 2019/0150170 A1* | 5/2019 | Park | H04W | 74/08 370/329 |
| 2019/0174541 A1* | 6/2019 | Wang | H04W | 72/23 |
| 2019/0200386 A1* | 6/2019 | Yang | H04W | 74/0875 |
| 2019/0208540 A1* | 7/2019 | Kim | H04W | 16/14 |
| 2019/0268912 A1* | 8/2019 | Myung | H04W | 72/23 |
| 2019/0281636 A1* | 9/2019 | Liu | H04W | 76/27 |
| 2019/0313451 A1* | 10/2019 | Liu | H04W | 72/0446 |
| 2020/0008241 A1* | 1/2020 | Zhou | H04W | 72/0446 |
| 2020/0015094 A1* | 1/2020 | Noh | H04W | 16/14 |
| 2020/0053777 A1* | 2/2020 | Babaei | H04L | 1/1812 |
| 2020/0100296 A1* | 3/2020 | Roy | H04W | 72/56 |
| 2020/0146063 A1* | 5/2020 | Xu | H04W | 24/08 |
| 2020/0178297 A1* | 6/2020 | Park | H04W | 74/0808 |
| 2020/0187251 A1* | 6/2020 | Noh | H04W | 74/0808 |
| 2020/0260486 A1* | 8/2020 | Zhou | H04L | 1/1893 |
| 2020/0260487 A1* | 8/2020 | Bhattad | H04W | 76/27 |
| 2020/0275490 A1* | 8/2020 | Li | H04L | 1/1812 |
| 2020/0404648 A1* | 12/2020 | Kim | H04L | 5/0094 |
| 2020/0404688 A1* | 12/2020 | Park | H04W | 72/1268 |
| 2020/0413485 A1* | 12/2020 | Kundu | H04W | 80/02 |
| 2021/0297223 A1* | 9/2021 | Yang | H04L | 1/1854 |
| 2021/0298049 A1* | 9/2021 | Myung | H04L | 1/1896 |
| 2022/0150916 A1* | 5/2022 | Liu | H04W | 74/0808 |
| 2022/0377791 A1* | 11/2022 | Nogami | H04W | 56/0015 |

OTHER PUBLICATIONS

Partial International Search Report—PCT/US2020/046168—ISA/EPO—dated Nov. 2, 2020.
Qualcomm Incorporated: "CR on UL Resource Allocation for 10MHz LAA SCell", 3GPP Draft, 36212 CR0235 (REL-14) R1-1613484, 3GPP TSG-RAN Meeting #87, 3rd Generation Partnership Project (3GPP), Mobile Competence Centre, 650, Route Des Lucioles, F-06921, Sophia-Antipolis Cedex, France, vol. TSG RAN, No. Reno, USA, Nov. 10, 2016-Nov. 14, 2016, Dec. 1, 2016 (Dec. 1, 2016), XP051664453, 7 Pages, Retrieved from the Internet: URL: http://www.3gpp.org/ftp/tsg%5Fran/TSG%5FRAN/TSGR%5F74/Docs/RP%2D162368%2Ezip [retrieved on Dec. 1, 2016] The Whole Document.

* cited by examiner

CHANNEL ACCESS PROCEDURES FOR AN UNLICENSED RADIO FREQUENCY SPECTRUM BAND

CROSS-REFERENCE TO RELATED APPLICATIONS

This patent application claims priority to India Patent Application No. 201941032933, filed on Aug. 14, 2019, entitled "CHANNEL ACCESS PROCEDURES FOR AN UNLICENSED RADIO FREQUENCY SPECTRUM BAND," and assigned to the assignee hereof. This patent application also claims priority to India Patent Application No. 201941034502, filed on Aug. 27, 2019, entitled "CHANNEL ACCESS PROCEDURES FOR AN UNLICENSED RADIO FREQUENCY SPECTRUM BAND," and assigned to the assignee hereof. The disclosures of these prior applications are considered part of and are incorporated by reference in this patent application.

FIELD OF THE DISCLOSURE

Aspects of the present disclosure generally relate to wireless communication and to techniques and apparatuses for channel access procedures for an unlicensed radio frequency spectrum band.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes: receiving a configuration that indicates a number of bits to be used in an indication of at least one of a listen-before-talk (LBT) category or a channel access priority class to be used for uplink communications; receiving the indication of at least one of the LBT category or the channel access priority class to be used for a transmission starting point associated with one or more uplink communications, wherein the indication includes the number of bits indicated in the configuration; and performing an LBT procedure for an uplink communication, of the one or more uplink communications, transmitted at the transmission starting point, according to the LBT category or the channel access priority class.

In some aspects, a UE for wireless communication includes: a memory; and one or more processors operatively coupled to the memory, the memory and the one or more processors configured to: receive a configuration that indicates a number of bits to be used in an indication of at least one of an LBT category or a channel access priority class to be used for uplink communications; receive the indication of at least one of the LBT category or the channel access priority class to be used for a transmission starting point associated with one or more uplink communications, wherein the indication includes the number of bits indicated in the configuration; and perform an LBT procedure for an uplink communication, of the one or more uplink communications, transmitted at the transmission starting point, according to the LBT category or the channel access priority class.

In some aspects, a non-transitory computer-readable medium storing a set of instructions for wireless communication includes: one or more instructions that, when executed by one or more processors of a UE, cause the UE to: receive a configuration that indicates a number of bits to be used in an indication of at least one of an LBT category or a channel access priority class to be used for uplink communications; receive the indication of at least one of the LBT category or the channel access priority class to be used for a transmission starting point associated with one or more uplink communications, wherein the indication includes the number of bits indicated in the configuration; and perform an LBT procedure for an uplink communication, of the one or more uplink communications, transmitted at the transmission starting point, according to the LBT category or the channel access priority class.

In some aspects, an apparatus for wireless communication includes: means for receiving a configuration that indicates a number of bits to be used in an indication of at least one of an LBT category or a channel access priority class to be used for uplink communications; means for receiving the indication of at least one of the LBT category or the channel access priority class to be used for a transmission starting point associated with one or more uplink communications, wherein the indication includes the number of bits indicated in the configuration; and means for performing an LBT procedure for an uplink communication, of the one or more uplink communications, transmitted at the transmission starting point, according to the LBT category or the channel access priority class.

In some aspects, a method of wireless communication, performed by a UE, may include receiving DCI that indicates a physical uplink control channel (PUCCH) resource for transmission of a PUCCH communication in an unlicensed radio frequency spectrum band; receiving an indication of an LBT category to be used in association with transmitting the PUCCH communication; and performing an LBT procedure for the PUCCH communication according to the indicated LBT category.

In some aspects, a method of wireless communication, performed by a UE, may include receiving an uplink grant that indicates a set of resources for an uplink communication; allocating a first portion of data, stored in a buffer of the UE and associated with one or more higher priority logical channels according to a logical channel prioritization (LCP) rule, to one or more resources of the set of resources, wherein the one or more higher priority logical channels are associated with one or more higher priority channel access priority classes; refraining from allocating a second portion of data, stored in the buffer of the UE and associated with one or more lower priority logical channels according to the LCP rule, to the set of resources, wherein the one or more lower priority logical channels are associated with one or more lower priority channel access priority classes; and transmitting the first portion of data in the set of resources using a channel access priority class associated with the one or more higher priority logical channels.

In some aspects, a method of wireless communication, performed by a UE, may include receiving an indication of at least one of an LBT category or a channel access priority class to be used for a transmission starting point of multiple transmission starting points associated with one or more uplink communications; and performing an LBT procedure for an uplink communication, of the one or more uplink communications, transmitted at the transmission starting point according to the LBT category or the channel access priority class.

In some aspects, a method of wireless communication, performed by a UE, may include receiving an uplink grant that indicates an uplink resource for transmission of an uplink communication in an unlicensed radio frequency spectrum band; receiving an indication that the uplink grant is canceled; and refraining from transmitting the uplink communication based at least in part on receiving the indication that the uplink grant is canceled.

In some aspects, a method of wireless communication, performed by a UE, may include receiving DCI that indicates an uplink resource for transmission of an uplink communication in an unlicensed radio frequency spectrum band; determining a CAPC for the uplink communication independently of the DCI; and transmitting the uplink communication in the indicated uplink resource using the determined CAPC.

In some aspects, a method of wireless communication, performed by a base station, may include determining a CAPC to be used for one or more downlink non-unicast messages, that are not transmitted in a synchronization signal block, based at least in part on a duration of the one or more downlink non-unicast messages; and transmitting the one or more downlink non-unicast messages using the determined CAPC.

In some aspects, a UE for wireless communication may include memory and one or more processors operatively coupled to the memory. The memory and the one or more processors may be configured to receive downlink control information that indicates a PUCCH resource for transmission of a PUCCH communication in an unlicensed radio frequency spectrum band; receive an indication of an LBT category to be used in association with transmitting the PUCCH communication; and perform an LBT procedure for the PUCCH communication according to the indicated LBT category.

In some aspects, a UE for wireless communication may include memory and one or more processors operatively coupled to the memory. The memory and the one or more processors may be configured to receive an uplink grant that indicates a set of resources for an uplink communication; allocate a first portion of data, stored in a buffer of the UE and associated with one or more higher priority logical channels according to an LCP rule, to one or more resources of the set of resources, wherein the one or more higher priority logical channels are associated with one or more higher priority channel access priority classes; refrain from allocating a second portion of data, stored in the buffer of the UE and associated with one or more lower priority logical channels according to the LCP rule, to the set of resources, wherein the one or more lower priority logical channels are associated with one or more lower priority channel access priority classes; and transmit the first portion of data in the set of resources using a channel access priority class associated with the one or more higher priority logical channels.

In some aspects, a UE for wireless communication may include memory and one or more processors operatively coupled to the memory. The memory and the one or more processors may be configured to receive an indication of at least one of an LBT category or a channel access priority class to be used for a transmission starting point of multiple transmission starting points associated with one or more uplink communications; and perform an LBT procedure for an uplink communication, of the one or more uplink communications, transmitted at the transmission starting point according to the LBT category or the channel access priority class.

In some aspects, a UE for wireless communication may include memory and one or more processors operatively coupled to the memory. The memory and the one or more processors may be configured to receive an uplink grant that indicates an uplink resource for transmission of an uplink communication in an unlicensed radio frequency spectrum band; receive an indication that the uplink grant is canceled; and refrain from transmitting the uplink communication based at least in part on receiving the indication that the uplink grant is canceled.

In some aspects, a UE for wireless communication may include memory and one or more processors operatively coupled to the memory. The memory and the one or more processors may be configured to receive DCI that indicates an uplink resource for transmission of an uplink communication in an unlicensed radio frequency spectrum band; determine a CAPC for the uplink communication independently of the DCI; and transmit the uplink communication in the indicated uplink resource using the determined CAPC.

In some aspects, a base station for wireless communication may include memory and one or more processors operatively coupled to the memory. The memory and the one or more processors may be configured to determine a CAPC to be used for one or more downlink non-unicast messages, that are not transmitted in a synchronization signal block, based at least in part on a duration of the one or more downlink non-unicast messages; and transmit the one or more downlink non-unicast messages using the determined CAPC.

In some aspects, a non-transitory computer-readable medium may store one or more instructions for wireless communication. The one or more instructions, when executed by one or more processors of a UE, may cause the one or more processors to: receive downlink control information that indicates a PUCCH resource for transmission of a PUCCH communication in an unlicensed radio frequency spectrum band; receive an indication of an LBT category to be used in association with transmitting the PUCCH communication; and perform an LBT procedure for the PUCCH communication according to the indicated LBT category.

In some aspects, a non-transitory computer-readable medium may store one or more instructions for wireless communication. The one or more instructions, when executed by one or more processors of a UE, may cause the one or more processors to: receive an uplink grant that indicates a set of resources for an uplink communication; allocate a first portion of data, stored in a buffer of the UE and associated with one or more higher priority logical channels according to an LCP rule, to one or more resources of the set of resources, wherein the one or more higher priority logical channels are associated with one or more higher priority channel access priority classes; refrain from allocating a second portion of data, stored in the buffer of the UE and associated with one or more lower priority logical channels according to the LCP rule, to the set of resources, wherein the one or more lower priority logical channels are associated with one or more lower priority channel access priority classes; and transmit the first portion of data in the set of resources using a channel access priority class associated with the one or more higher priority logical channels.

In some aspects, a non-transitory computer-readable medium may store one or more instructions for wireless communication. The one or more instructions, when executed by one or more processors of a UE, may cause the one or more processors to: receive an indication of at least one of an LBT category or a channel access priority class to be used for a transmission starting point of multiple transmission starting points associated with one or more uplink communications; and perform an LBT procedure for an uplink communication, of the one or more uplink communications, transmitted at the transmission starting point according to the LBT category or the channel access priority class.

In some aspects, a non-transitory computer-readable medium may store one or more instructions for wireless communication. The one or more instructions, when executed by one or more processors of a UE, may cause the one or more processors to: receive an uplink grant that indicates an uplink resource for transmission of an uplink communication in an unlicensed radio frequency spectrum band; receive an indication that the uplink grant is canceled; and refrain from transmitting the uplink communication based at least in part on receiving the indication that the uplink grant is canceled.

In some aspects, a non-transitory computer-readable medium may store one or more instructions for wireless communication. The one or more instructions, when executed by one or more processors of a UE, may cause the one or more processors to: receive DCI that indicates an uplink resource for transmission of an uplink communication in an unlicensed radio frequency spectrum band; determine a CAPC for the uplink communication independently of the DCI; and transmit the uplink communication in the indicated uplink resource using the determined CAPC.

In some aspects, a non-transitory computer-readable medium may store one or more instructions for wireless communication. The one or more instructions, when executed by one or more processors of a base station, may cause the one or more processors to: determine a CAPC to be used for one or more downlink non-unicast messages, that are not transmitted in a synchronization signal block, based at least in part on a duration of the one or more downlink non-unicast messages; and transmit the one or more downlink non-unicast messages using the determined CAPC.

In some aspects, an apparatus for wireless communication may include means for receiving downlink control information that indicates a PUCCH resource for transmission of a PUCCH communication in an unlicensed radio frequency spectrum band; means for receiving an indication of an LBT category to be used in association with transmitting the PUCCH communication; and means for performing an LBT procedure for the PUCCH communication according to the indicated LBT category.

In some aspects, an apparatus for wireless communication may include means for receiving an uplink grant that indicates a set of resources for an uplink communication; means for allocating a first portion of data, stored in a buffer of the apparatus and associated with one or more higher priority logical channels according to an LCP rule, to one or more resources of the set of resources, wherein the one or more higher priority logical channels are associated with one or more higher priority channel access priority classes; means for refraining from allocating a second portion of data, stored in the buffer of the apparatus and associated with one or more lower priority logical channels according to the LCP rule, to the set of resources, wherein the one or more lower priority logical channels are associated with one or more lower priority channel access priority classes; and means for transmitting the first portion of data in the set of resources using a channel access priority class associated with the one or more higher priority logical channels.

In some aspects, an apparatus for wireless communication may include means for receiving an indication of at least one of an LBT category or a channel access priority class to be used for a transmission starting point of multiple transmission starting points associated with one or more uplink communications; and means for performing an LBT procedure for an uplink communication, of the one or more uplink communications, transmitted at the transmission starting point according to the LBT category or the channel access priority class.

In some aspects, an apparatus for wireless communication may include means for receiving an uplink grant that indicates an uplink resource for transmission of an uplink communication in an unlicensed radio frequency spectrum band; means for receiving an indication that the uplink grant is canceled; and means for refraining from transmitting the uplink communication based at least in part on receiving the indication that the uplink grant is canceled.

In some aspects, an apparatus for wireless communication may include means for receiving DCI that indicates an uplink resource for transmission of an uplink communication in an unlicensed radio frequency spectrum band; means for determining a CAPC for the uplink communication independently of the DCI; and means for transmitting the uplink communication in the indicated uplink resource using the determined CAPC.

In some aspects, an apparatus for wireless communication may include means for determining a CAPC to be used for one or more downlink non-unicast messages, that are not transmitted in a synchronization signal block, based at least in part on a duration of the one or more downlink non-unicast messages; and means for transmitting the one or more downlink non-unicast messages using the determined CAPC.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
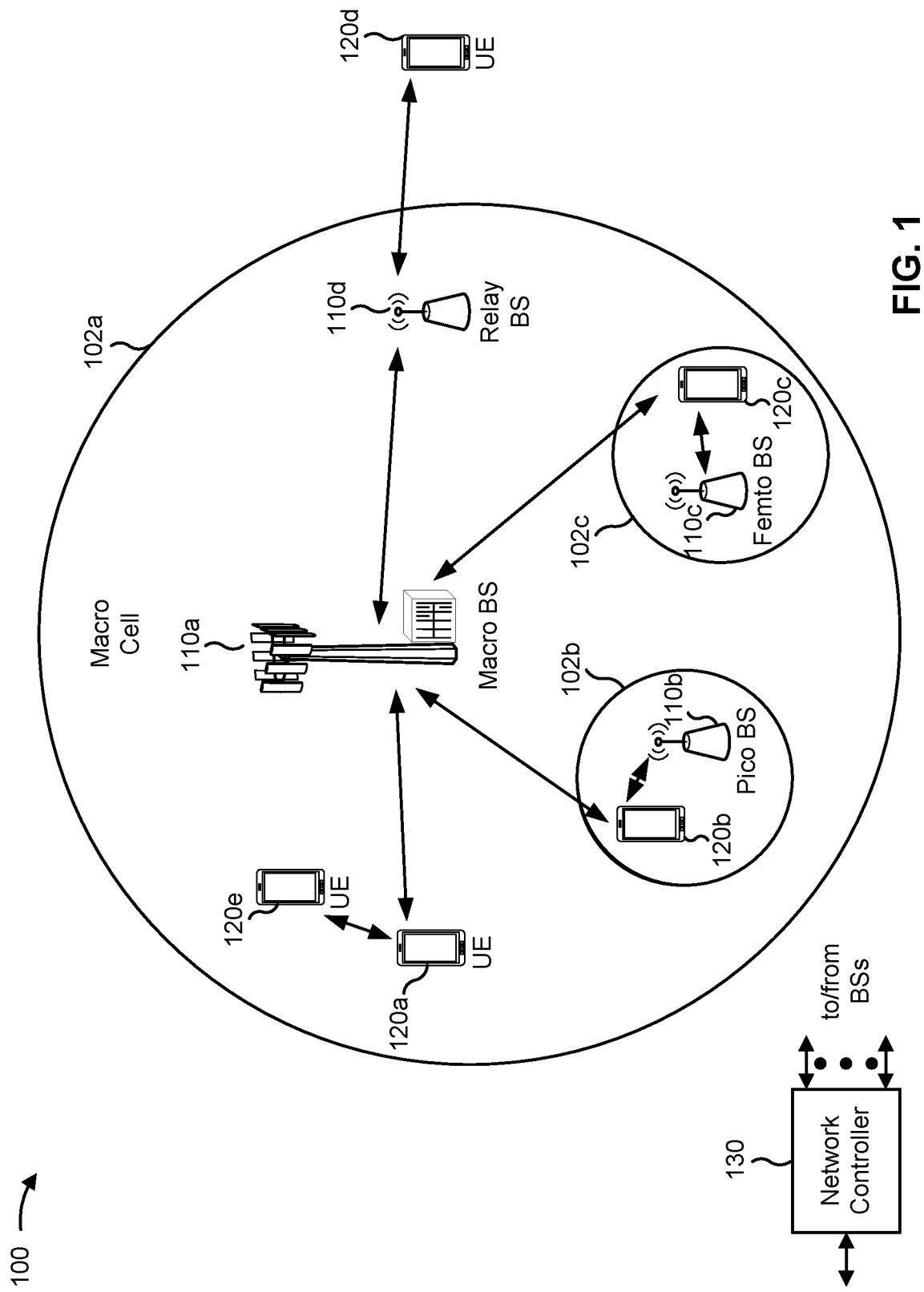
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
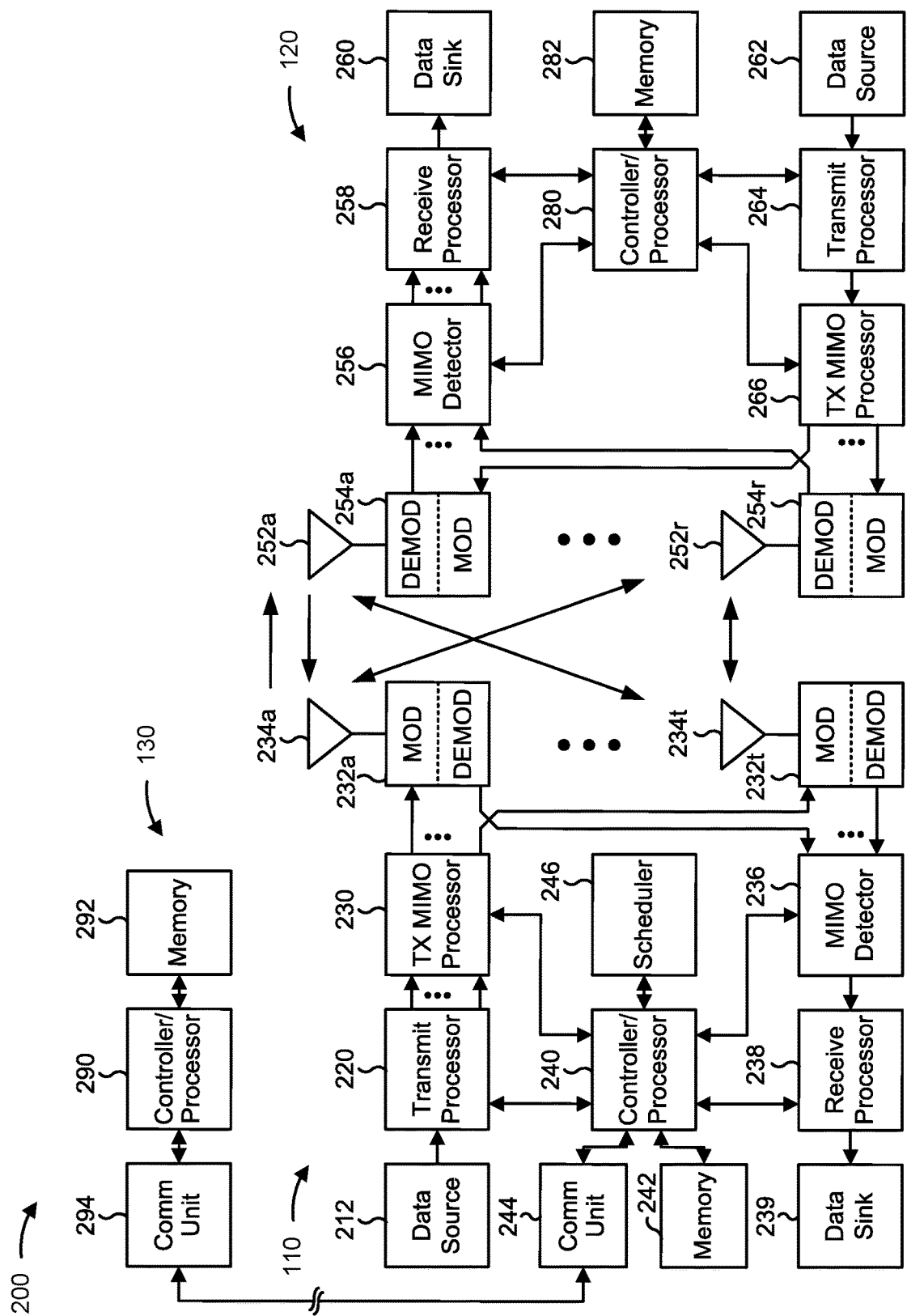
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with channel access procedures for an unlicensed radio frequency spectrum band, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and/or other processes as described herein. A scheduler 246 may schedule UEs for data transmission on the downlink and/or uplink.

In some aspects, UE 120 may include means for receiving a configuration that indicates a number of bits to be used in an indication of at least one of an LBT category or a channel access priority class to be used for uplink communications; means for receiving the indication of at least one of the LBT category or the channel access priority class to be used for a transmission starting point associated with one or more uplink communications, wherein the indication includes the number of bits indicated in the configuration; means for performing an LBT procedure for an uplink communication, of the one or more uplink communications, transmitted at the transmission starting point, according to the LBT category or the channel access priority class; and/or the like. Additionally, or alternatively, the UE 120 may include means for receiving downlink control information that indicates a physical uplink control channel (PUCCH) resource for transmission of a PUCCH communication in an unlicensed radio frequency spectrum band; means for receiving an indication of a listen-before-talk (LBT) category to be used in association with transmitting the PUCCH communication; means for performing an LBT procedure for the PUCCH communication according to the indicated LBT category; and/or the like. Additionally, or alternatively, UE 120 may include means for receiving an uplink grant that indicates a set of resources for an uplink communication; means for allocating a first portion of data, stored in a buffer of the UE 120 and associated with one or more higher priority logical channels according to a logical channel prioritization (LCP) rule, to one or more resources of the set of resources, wherein the one or more higher priority logical channels are associated with one or more higher priority channel access priority classes; means for refraining from allocating a second portion of data, stored in the buffer of the UE 120 and associated with one or more lower priority logical channels according to the LCP rule, to the set of resources, wherein the one or more lower priority logical channels are associated with one or more lower priority channel access priority classes; means for transmitting the first portion of data in the set of resources using a channel access priority class associated with the one or more higher priority logical channels; and/or the like. Additionally, or alternatively, UE 120 may include means for receiving an indication of at least one of an LBT category or a channel access priority class to be used for a transmission starting point of multiple transmission starting points associated with one or more uplink communications; means for performing an LBT procedure for an uplink communication, of the one or more uplink communications, transmitted at the transmission starting point according to the LBT category or the channel access priority class; and/or the like. Additionally, or alternatively, UE 120 may include means for receiving an uplink grant that indicates an uplink resource for transmission of an uplink communication in an unlicensed radio frequency spectrum band; means for receiving an indication that the uplink grant is canceled; means for refraining from transmitting the uplink communication based at least in part on receiving the indication that the uplink grant is canceled; and/or the like. Additionally, or alternatively, UE 120 may include means for receiving downlink control information (DCI) that indicates an uplink resource for transmission of an uplink communication in an unlicensed radio frequency spectrum band; means for determining a channel access priority class (CAPC) for the uplink communication independently of the DCI; means for transmitting the uplink communication in the indicated uplink resource using the determined CAPC; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a CAPC to be used for one or more downlink non-unicast messages, that are not transmitted in a synchronization signal block, based at least in part on a duration of the one or more downlink non-unicast messages; means for transmitting the one or more downlink non-unicast messages using the determined CAPC; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Some aspects described herein related to an unlicensed radio frequency spectrum band, which may be used for communications in a wireless network, such as wireless network 100. In some aspects, the unlicensed radio frequency spectrum band may be used by base stations 110 and UEs 120 of a cellular network for Long Term Evolution (LTE) communications and/or LTE-Advanced (LTE-A) communications, and by Wi-Fi access points and Wi-Fi stations of a Wi-Fi network for Wi-Fi communications. The unlicensed radio frequency spectrum band may be used in the cellular network in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

Prior to gaining access to, and communicating over, an unlicensed radio frequency spectrum band, a base station 110 or UE 120 may perform a listen-before-talk (LBT) procedure to contend for access to the unlicensed radio frequency spectrum band. An LBT procedure, sometimes referred to as a clear channel assessment (CCA) procedure, may include performing a CCA to determine whether a channel of the unlicensed radio frequency spectrum band is available. When it is determined that the channel of the unlicensed radio frequency spectrum band is not available (e.g., because another apparatus is already using the channel of the unlicensed radio frequency spectrum band), a CCA procedure may be performed for the channel again at a later time. In environments in which a base station 110 or UE 120 may be starved of access to a channel of an unlicensed radio frequency spectrum band due to Wi-Fi activity, an extended CCA procedure may be employed to increase the likelihood that the base station 110 or UE 120 will successfully contend for access to the channel of the unlicensed radio frequency spectrum band. An extended CCA procedure involves the performance of a random number of CCA procedures (from 1 to q), in accordance with an extended CCA counter.

Regardless of whether a single CCA procedure is performed or multiple CCA procedures are performed, each CCA procedure may include detecting or sensing an energy level on the channel of the unlicensed radio frequency spectrum band and determining whether the energy level is below a threshold. When the energy level is below the threshold, the CCA procedure is successful and contention to access the channel of the unlicensed radio frequency spectrum band may be successful. When the energy level exceeds the threshold, the CCA procedure is unsuccessful and contention to access the channel of the unlicensed radio frequency spectrum band may be unsuccessful.

When a CCA procedure or extended CCA procedure is successful, a transmission may be made over the channel of the unlicensed radio frequency spectrum band. When a packet error is encountered (e.g., due to a collision of transmissions made by two or more transmitting apparatuses, of due to poor channel conditions), a hybrid automatic repeat request (HARD)-based retransmission may be performed. In some examples, the retransmission may be modified from the original transmission using rate adaptation (e.g., based at least in part on a channel quality indicator (CQI) reported by a UE).

Some techniques and apparatuses described herein address various issues associated with contending for access to an unlicensed radio frequency spectrum band or another type of channel in which devices contend for access. For example, some techniques and apparatuses described herein address issues associated with determining an LBT category to be used for an LBT procedure, determining a channel access priority class (CAPC) for one or more communications, and/or the like.

Figure 3:
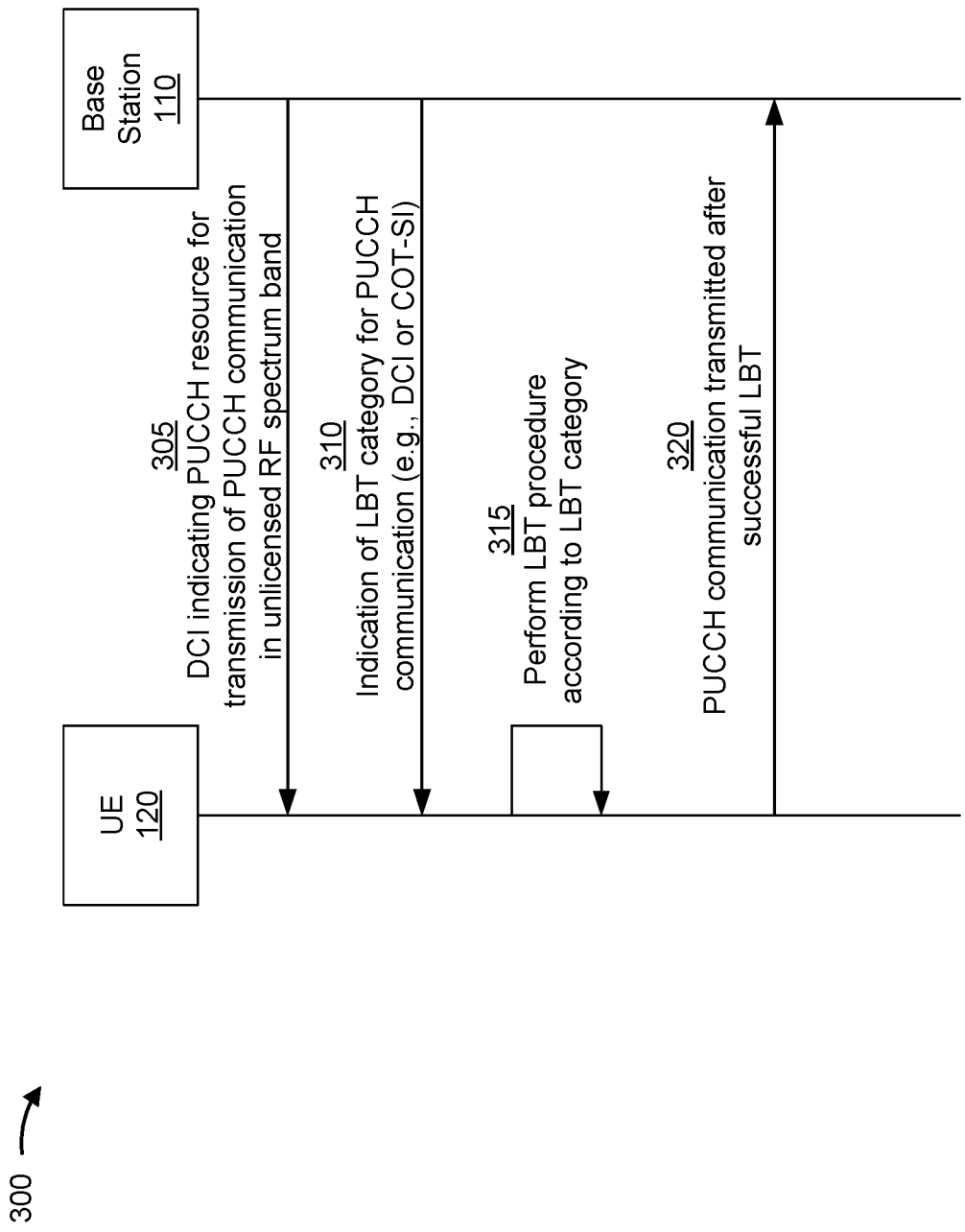
FIGS. 3-8 are diagrams illustrating examples of channel access procedures for an unlicensed radio frequency spectrum band, in accordance with various aspects of the present disclosure.

FIG. 3 is a diagram illustrating an example 300 of channel access procedures for an unlicensed radio frequency spectrum band, in accordance with various aspects of the present disclosure. As shown in FIG. 3, a base station 110 and a UE 120 may communicate with one another.

As shown by reference number 305, the base station 110 may transmit, and the UE 120 may receive, downlink control information (DCI) that indicates a physical uplink control channel (PUCCH) resource for transmission of a PUCCH communication in an unlicensed radio frequency spectrum band. For example, the DCI may indicate one or more time resources, one or more frequency resources, one or more spatial resources (e.g., a beam), and/or the like. In some aspects, the PUCCH communication may include a channel state information (CSI) report scheduled by the DCI, acknowledgement (ACK) or negative acknowledgment (NACK) (collectively, ACK/NACK) feedback for a downlink data communication scheduled by the DCI, and/or the like.

As shown by reference number 310, the base station 110 may transmit, and the UE 120 may receive, an indication of an LBT category to be used in association with transmitting the PUCCH communication. An LBT category may define a channel sensing duration during which a device contending for access to a channel performs a CCA procedure. The channel sensing duration may indicate a length of time during which the device detects or senses an energy level on the channel to determine whether the energy level is less than (or equal to) a threshold. If the energy level is less than (or equal to) the threshold, then the LBT/CCA procedure is successful, and the device transmits a communication. If the energy level is greater than (or equal to) the threshold, then the CCA procedure is unsuccessful and the device may wait for a period of time (e.g., a backoff duration) before performing the CCA procedure again.

Example LBT categories include category one (Cat 1) LBT, category two (Cat 2) LBT, category three (Cat 3) LBT, and category four (Cat 4) LBT. In Cat 1 LBT, also referred to as no LBT, an LBT procedure is not performed prior to transmission of a communication on the channel. In Cat 2 LBT, the channel sensing duration is fixed (e.g., without random back-off). For example, a 16 microsecond channel sensing duration is used for 16 microsecond Cat 2 LBT, and a 25 microsecond channel sensing duration is used for 25 microsecond Cat 2 LBT. In Cat 3 LBT, the channel sensing duration is fixed (e.g., a contention window has a fixed size), and random back-off is used. In Cat 4 LBT, the channel sensing duration is variable (e.g., a contention window has a variable size), and random back-off is used.

In Cat 4 LBT, the channel sensing duration may be variable depending on whether the device contending for access to the channel senses interference (e.g., an energy level greater than or equal to a threshold). Using a Cat 4 LBT procedure, the device may select a minimum channel sensing duration, which may be defined by a CAPC associated with the Cat 4 LBT procedure being used by the device. For example, four different CAPCs may be associated with Cat 4 LBT, with the lowest CAPC value (e.g., CAPC 0) being associated with the highest priority for Cat 4 LBT (e.g., the shortest contention window size and shortest back-off duration), and the highest CAPC value (e.g., CAPC 3) being associated with the lowest priority for Cat 4 LBT (e.g., the longest contention window size and longest back-off duration). Generally, a higher CAPC value (e.g., a higher CAPC index) is associated with a lower priority. In Cat 4 LBT, if the device detects interference in the minimum channel sensing duration for a CCA procedure as defined by a CAPC for the Cat 4 LBT procedure, then the device may increase the channel sensing duration for the next CCA procedure.

In some aspects, the base station 110 may indicate the LBT category in a channel occupancy time-structure indication (COT-SI). The base station 110 may transmit the COT-SI (e.g., to all connected mode UEs 120 connected to the base station 110) after the base station 110 acquires the channel. The COT-SI may indicate a duration of time during which the base station 110 has access to the channel. The duration of time may be selected as a channel occupancy time (COT) with a maximum duration defined by a maximum COT. In some aspects, the COT-SI may indicate the LBT category based at least in part on whether the PUCCH resource, indicated in the DCI, is included in a COT indicated in the COT-SI. Additionally, or alternatively, the COT-SI may indicate whether to use Cat 2 LBT or Cat 4 LBT for the PUCCH communication.

For example, if the PUCCH resource indicated in the DCI is included in the COT indicated in the COT-SI, then the UE 120 may use Cat 2 LBT (or a first LBT category with a shorter channel sensing duration) because there is a lower likelihood of a collision due to the channel being acquired by the base station 110 during occurrence of the PUCCH resource. As another example, if the PUCCH resource indicated in the DCI is not included in the COT indicated in the COT-SI, then the UE 120 may use Cat 4 LBT (or a second LBT category with a longer channel sensing duration) because there is a higher likelihood of a collision due to the channel not being acquired by the base station 110 during occurrence of the PUCCH resource.

In some aspects, the base station 110 may indicate the LBT category in the DCI that indicates the PUCCH resource for transmission of the PUCCH communication. For example, the DCI may include a field for indicating the LBT category, such as Cat 1 LBT (e.g., no LBT), Cat 2 LBT (e.g., 16 microsecond Cat 2 LBT or 25 microsecond Cat 2 LBT), Cat 4 LBT (and, in some aspects, a CAPC associated with the Cat 4 LBT), and/or the like.

In some aspects, the LBT category may be implicitly indicated (e.g., by the DCI). For example, in some aspects, any PUCCH communication in the unlicensed radio frequency spectrum band that is scheduled by DCI may be associated with a default LBT category. In some aspects, the default LBT category is Cat 2 LBT. For example, the UE 120 may be configured to use Cat 2 LBT (or another default LBT category) for any PUCCH communication scheduled in the unlicensed radio frequency spectrum band using DCI. In this case, the base station 110 may schedule the PUCCH communication such that the PUCCH resource is included in the COT acquired by the base station 110.

As shown by reference number 315, the UE 120 may perform an LBT procedure (e.g., to contend for access to the unlicensed radio frequency band for transmission of the PUCCH communication in the PUCCH resource) according to the indicated LBT category. For example, as described elsewhere herein, the UE 120 may perform the LBT procedure by sensing a channel for a channel sensing duration indicated by the LBT category. If the energy detected by the UE 120 on the channel satisfies a threshold (e.g., if the LBT procedure fails), then the UE 120 may refrain from transmitting the PUCCH communication on the channel. If the energy detected by the UE 120 on the channel does not satisfy a threshold (e.g., if the LBT procedure succeeds), then the UE 120 may transmit the PUCCH communication, as shown by reference number 320.

When the UE 120 receives an indication of an LBT category to be used for a PUCCH communication, on the unlicensed radio frequency spectrum band, that is scheduled using DCI, a likelihood of collision may be reduced and latency may be reduced. For example, a UE 120 normally uses Cat 4 LBT for PUCCH transmissions when the UE 120 acquires the channel for a COT. However, for PUCCH communications scheduled by the base station 110 using DCI, the base station 110 may have acquired the channel for a COT, and may instruct the UE 120 to use a shorter channel sensing duration so that the PUCCH communication is transmitted during the COT where the base station 110 has acquired the channel. In this way, latency and a likelihood of collision may be reduced.

As indicated above, FIG. 3 is provided as an example. Other examples may differ from what is described with regard to FIG. 3.

Figure 4:
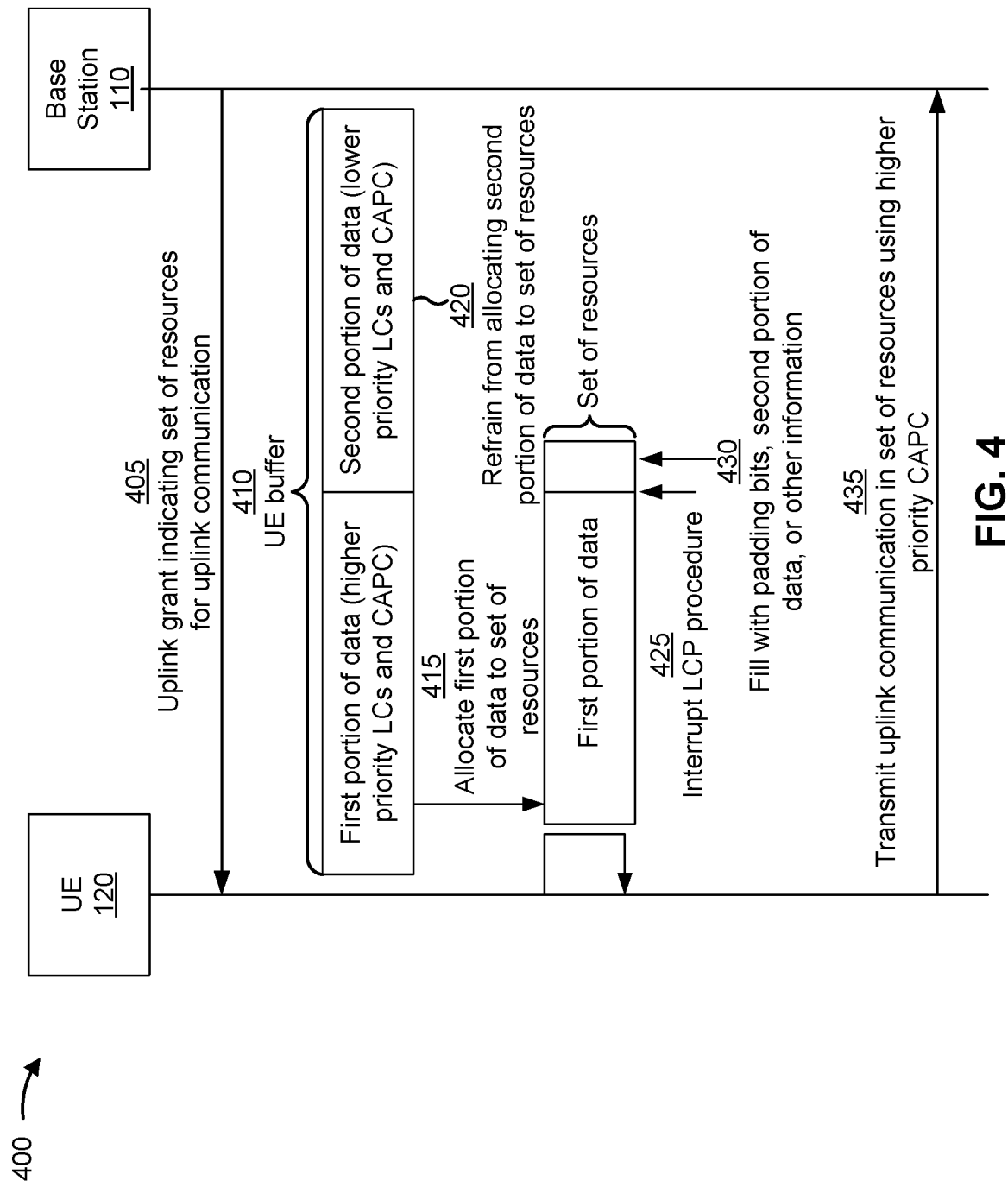

FIG. 4 is a diagram illustrating an example 400 of channel access procedures for an unlicensed radio frequency spectrum band, in accordance with various aspects of the present disclosure. As shown in FIG. 4, a base station 110 and a UE 120 may communicate with one another.

As shown by reference number 405, the base station 110 may transmit, and the UE 120 may receive, an uplink grant that indicates a set of resources for an uplink communication. For example, the uplink grant (e.g., included in DCI) may indicate one or more time resources, one or more frequency resources, one or more spatial resources (e.g., a beam), and/or the like. In some aspects, the uplink communication is an uplink data communication, such as a physical uplink shared channel (PUSCH) communication.

As shown by reference number 410, the UE 120 may store data for transmission in a buffer (e.g., memory) of the UE 120. As further shown, the data may include a first portion of data and a second portion of data. The first portion of data may be associated with one or more higher priority logical channels (shown as LCs) according to a logical channel prioritization (LCP) rule, and the second portion of data may be associated with one or more lower priority logical channels according to the LCP rule. For example, the UE 120 may be configured with an LCP rule that indicates a set of logical channels and a corresponding set of CAPCs (e.g., one CAPC for each logical channel). A higher priority logical channel may be associated with a higher priority CAPC (e.g., having a lower CAPC index value), and a lower priority logical channel may be associated with a lower priority CAPC (e.g., having a higher CAPC index value).

The UE 120 may normally apply the LCP rule to include data for all logical channels (e.g., some data from each logical channel for which data is stored in the buffer), or for multiple logical channels, in the uplink communication. For example, if the buffer includes high priority ultra-reliable low latency communication (URLLC) data and low priority enhanced mobile broadband (eMBB) data, then the UE 120 may allocate all of the URLLC data to the uplink communication, and may then allocate the eMBB data to the uplink communication. However, when transmitting an uplink communication in an unlicensed radio frequency spectrum band (e.g., using an LTE-LAA procedure, using autonomous uplink, and/or the like), the UE 120 may be required to use a CAPC associated with the lowest priority data included in the uplink communication (e.g., a highest CAPC index value among all CAPC index values associated with the data included in the uplink communication). In this case, the UE 120 may use a low priority CAPC (e.g., associated with eMBB data) to transmit high priority data (e.g., URLLC data), which may increase latency (e.g., due to failure of an LBT procedure with a longer channel sensing time indicated by the lower priority CAPC). This could result in URLLC requirements (e.g., quality of service (QoS) requirements) not being satisfied. Some techniques and apparatuses described herein address this issue.

As shown by reference number 415, the UE 120 may allocate the first portion of data, associated with the one or more higher priority logical channels, to one or more resources of the set of resources. As shown by reference number 420, the UE 120 may refrain from allocating a second portion of data, associated with one or more lower priority logical channels, to the set of resources. For example, as shown by reference number 425, the UE 120 may interrupt an LCP procedure after allocating the first portion of data to the set of resources. In some aspects, the UE 120 may interrupt the LCP procedure after allocating data for a particular logical channel, after allocating data for a threshold number of logical channels, after allocating data for a logical channel with a particular priority (e.g., associated with a particular CAPC value), and/or the like.

As shown by reference number 430, if the first portion of data does not fill the set of resources, then the UE 120 may include additional information in the remaining portion of the set of resources. In some aspects, the UE 120 may include some or all of the second portion of data in the remaining portion of the set of resources. In this case, the UE 120 may transmit the uplink communication using a higher priority CAPC associated with the first portion of data even though the second portion of data, associated with a lower priority CAPC, is included in the set of resources, as described in more detail below.

Additionally, or alternatively, the UE 120 may include one or more padding bits in the remaining portion of the set of resources. In this case, the first portion of data plus the padding bits may fill the set of resources, and the UE 120 may transmit the uplink communication using a higher priority CAPC associated with the first portion of data.

Additionally, or alternatively, the UE 120 may transmit a buffer status report (BSR) in the remaining portion of the set of resources. The BSR may indicate that the UE 120 has additional data stored in the buffer, which may trigger the base station 110 to transmit an uplink grant to the UE 120 (e.g., to permit the UE 120 to transmit the second portion of data). Additionally, or alternatively, the UE 120 may include, in the remaining portion of the set of resources, an indication that the UE has interrupted an LCP procedure. In some aspects, this indication may be included in a medium access control (MAC) control element (CE) (collectively, MAC-CE). This may trigger the base station 110 to transmit an uplink grant to the UE 120 (e.g., to permit the UE 120 to transmit the second portion of data).

As shown by reference number 435, the UE 120 may transmit the uplink communication in the set of resources using a higher priority CAPC associated with the one or more higher priority logical channels. The uplink communication may include the first portion of data allocated to the set of resources, as described above. In some aspects, the uplink communication may also include padding bits, some of the second portion of data, and/or other information, as described above. By interrupting the LCP procedure and/or transmitting the uplink communication using a higher priority CAPC (e.g., associated with the first portion of data) rather than a lower priority CAPC (e.g., associated with the second portion of data), the UE 120 may reduce latency, which may assist with satisfying QoS requirements for the higher priority first portion of data.

In some aspects, the UE 120 may perform one or more of the above operations (e.g., allocating the first portion of data and refraining from allocating the second portion of data, interrupting the LCP procedure, transmitting the uplink communication with a higher priority CAPC than a lowest priority CAPC associated with data stored in the UE buffer, and/or the like) based at least in part on determining that an LCP restriction condition is satisfied. Additionally, or alternatively, the UE 120 may perform any other type of logical channel restriction procedure (e.g., by excluding data associated with a set of logical channels from the uplink communication based at least in part on an LCP priority of the set of logical channels, based at least in part on a logical channel configuration, based at least in part on a CAPC associated with the set of logical channels, and/or the like) based at least in part on determining that an LCP restriction condition is satisfied.

In some aspects, the UE 120 may determine that the LCP restriction condition is satisfied based at least in part on a determination that the first portion of data, or a set of padding bits to be used to fill the set of resources, satisfies a condition with respect to filling the set of resources with data. For example, a set of padding bits may be used to fill a remaining portion of the set of resources if the set of padding bits is less than or equal to a threshold size (e.g., includes a number of bits that is less than or equal to a threshold), if the set of padding bits is less than or equal to a threshold percentage of the total bits included in the set of resources, and/or the like. Similarly, a set of padding bits may be used to fill a remaining portion of the set of resources if the first portion of data is greater than or equal to a threshold size (e.g., includes a number of bits that is greater than or equal to a threshold), if the first portion of data is greater than or equal to a threshold percentage of the total bits included in the set of resources, and/or the like. In some aspects, the threshold may depend on a CAPC used to transmit the uplink communication, a highest priority CAPC associated with data in the UE buffer, and/or the like.

Additionally, or alternatively, the UE 120 may determine that the LCP restriction condition is satisfied based at least in part on a determination that all data from the one or more higher priority logical channels has been allocated to the set of resources. For example, a set of padding bits may be used to fill a remaining portion of the set of resources if all data with a priority that is greater than or equal to a threshold priority has been included in the set of resources.

Additionally, or alternatively, the UE 120 may determine that the LCP restriction condition is satisfied based at least in part on a determination that a size of the second portion of data satisfies a condition. In some aspects, the condition is based at least in part on the one or more lower priority logical channels. For example, a set of padding bits may be used to fill a remaining portion of the set of resources based at least in part on excluded data from an excluded logical channel. The UE 120 may use a set of padding bits with a size that is based at least in part on an LCP bucket size and/or a buffer size associated with the excluded logical channel.

Additionally, or alternatively, the UE 120 may determine that the LCP restriction condition is satisfied based at least in part on a determination that a contention window size associated with the one or more lower priority logical channels differs from a contention window size of the one or more higher priority logical channels by a threshold amount. For example, if a low priority logical channel is associated with an LBT contention window size that is within a threshold size of a high priority logical channel (e.g., the highest priority logical channel for which data is transmitted) and/or is within a threshold size of a contention window size defined by a CAPC used to transmit the uplink communication, then the UE 120 may include data for the low priority logical channel in the set of resources.

Additionally, or alternatively, the UE 120 may determine that the LCP restriction condition is satisfied based at least in part on an LBT category indicated by the uplink grant. For example, the UE 120 may interrupt the LCP procedure for a first LBT category (e.g., Cat 4 LBT), and may refrain from interrupting the LCP procedure for a second LBT category (e.g., Cat 1 LBT or Cat 2 LBT). Additionally, or alternatively, the UE 120 may determine that the LCP restriction condition is satisfied based at least in part on a type of cell in which the uplink communication is to be transmitted. For example, for a Frame Based Equipment (FBE) cell, Cat 2 LBT may be used, so the UE 120 may not perform LCP restriction for the FBE cell. In some aspects, the UE 120 may perform LCP restriction for a Load Based Equipment (LBE) cell.

Additionally, or alternatively, the UE 120 may determine that the LCP restriction condition is satisfied based at least in part on an indication to activate an LCP restriction procedure. For example, the base station 110 may transmit, to the UE 120, an indication to activate or deactivate the LCP restriction procedure. In some aspects, the indication may be included in a MAC-CE. In some aspects, the base station 110 may activate the LCP restriction procedure based at least in part on a determination that channel congestion and/or interference is greater than or equal to a threshold, and may deactivate the LCP restriction procedure based at least in part on a determination that channel congestion and/or interference is less than or equal to a threshold.

Additionally, or alternatively, the UE 120 may determine that the LCP restriction condition is satisfied based at least in part on a determination that an interference level measured by the UE satisfies a threshold. In some aspects, the UE 120 may activate the LCP restriction procedure based at least in part on a determination that channel congestion and/or interference is greater than or equal to a threshold, and may deactivate the LCP restriction procedure based at least in part on a determination that channel congestion and/or interference is less than or equal to a threshold. Additionally, or alternatively, the UE 120 may activate or deactivate the LCP restriction procedure based at least in part on a size of a contention window, a number of busy slots detected within one or more LBT procedures, a network indication of congestion in the channel, and/or the like.

As indicated above, FIG. 4 is provided as an example. Other examples may differ from what is described with regard to FIG. 4.

Figure 5:
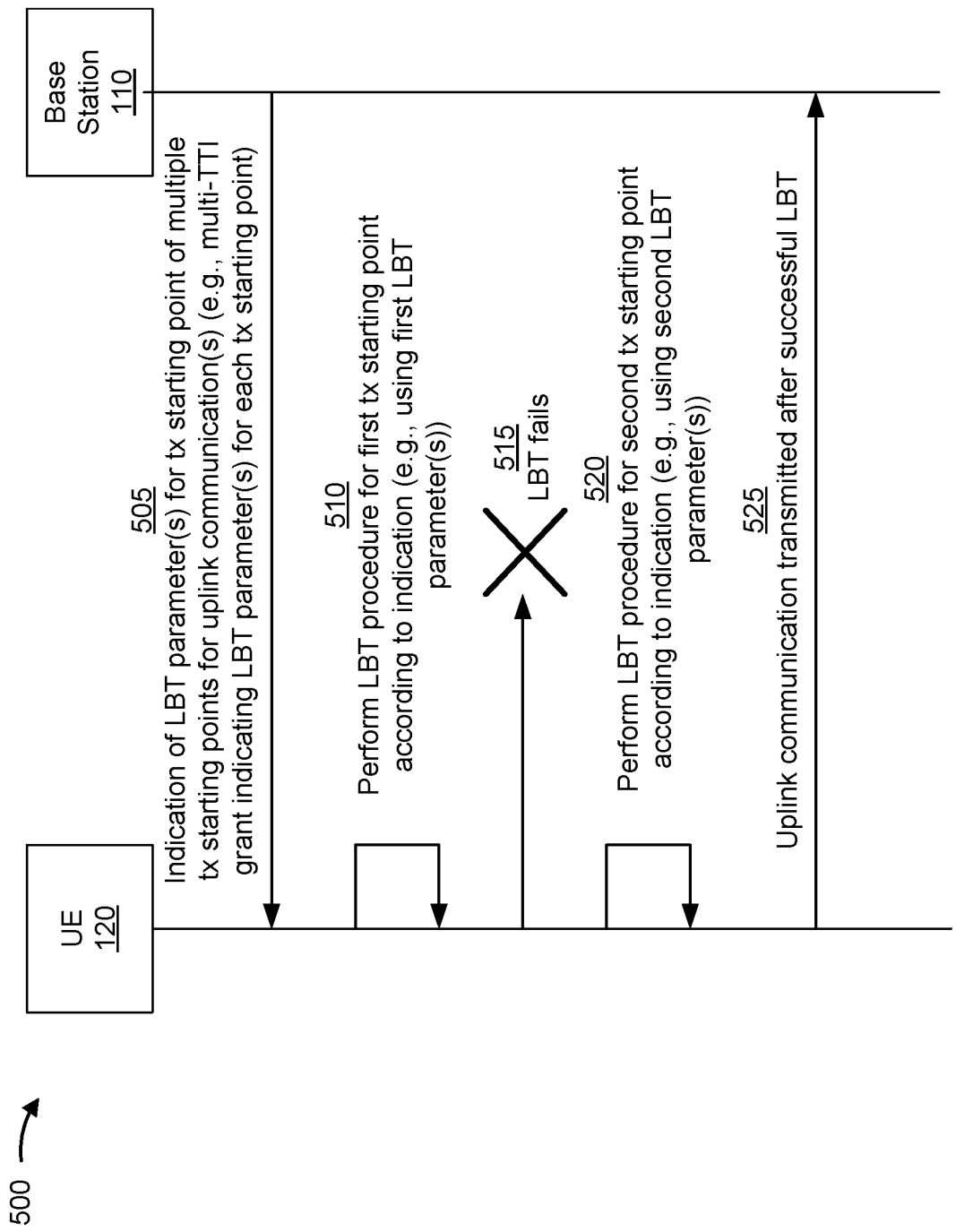

FIG. 5 is a diagram illustrating an example 500 of channel access procedures for an unlicensed radio frequency spectrum band, in accordance with various aspects of the present disclosure. As shown in FIG. 5, a base station 110 and a UE 120 may communicate with one another.

As shown by reference number 505, the base station 110 may transmit, and the UE 120 may receive, an indication of one or more LBT parameters (e.g., an LBT category, a CAPC, and/or the like) to be used for a transmission (tx) starting point of multiple transmission starting points associated with one or more uplink communications. For example, the base station 110 may transmit a multi-transmission time interval (multi-TTI) uplink grant that indicates an LBT category and/or a CAPC to be used for each transmission starting point (e.g., each uplink grant, which indicates a different uplink resource) granted by the multi-TTI grant. Although some operations are described herein in connection with transmission starting points for uplink communications scheduled by a multi-TTI grant, these operations may also apply to other scenarios where multiple transmission time points are using in an unlicensed radio frequency spectrum band or another type of communication system in which devices contend for channel access.

A multi-TTI uplink grant may indicate multiple resources granted for uplink communications, such as for multiple uplink communications (e.g., each of which may be transmitted in a different resource) or for a single uplink communication in which an LBT procedure is to be potentially performed in each of the multiple resources. For example, if a first LBT procedure fails for a first transmission starting point (e.g., a first resource for a first uplink grant in the multi-TTI uplink grant), then the UE 120 may attempt a second LBT procedure for a second transmission starting point (e.g., a second resource for a second uplink grant in the multi-TTI uplink grant), and so on until the UE 120 successfully transmits the uplink communication.

As shown by reference number 510, the UE 120 may perform an LBT procedure (e.g., a first LBT procedure) for a first transmission starting point according to the indicated LBT parameter(s) (e.g., an indicated LBT category and/or an indicated CAPC). As shown by reference number 515, the first LBT procedure may fail. As shown by reference number 520, the UE 120 may perform an LBT procedure (e.g., a second LBT procedure) for a second transmission starting point according to the indicated LBT parameter(s).

In some aspects, the base station 110 may indicate (e.g., in the multi-TTI grant) that a single LBT category and/or a single CAPC is to be used for all transmission starting points. In this case, the UE 120 may use the same LBT category and/or the same CAPC for the first LBT procedure, the second LBT procedure, and so on. In some aspects, the UE 120 may use different LBT categories and/or different CAPCs for different transmission starting points or for different sets of transmission starting points. For example, the UE 120 may use an LBT category and/or a CAPC (e.g., a first LBT category or a first CAPC) indicated by the base station 110 for an initial LBT procedure in an initial transmission starting point, and may use a second LBT category and/or a second CAPC for a subsequent LBT procedure (e.g., a single LBT procedure after the initial LBT procedure, multiple LBT procedures after the initial LBT procedure, all LBT procedures after the initial LBT procedure, and/or the like) in a subsequent transmission starting point. The first LBT category and/or the first CAPC may define a first channel sensing time that is shorter than a second channel sensing time defined by the second LBT category and/or the second CAPC. For example, if the LBT category indicated by the base station 110 is Cat 1 LBT (e.g., no LBT), then the second LBT category may be either a 16 microsecond Cat 2 LBT or a 25 microsecond Cat 2 LBT. As another example, if the LBT category indicated by the base station is 16 microsecond Cat 2 LBT, then the second LBT category may be a 25 microsecond Cat 2 LBT.

In some aspects, the indication may include separate indications of an LBT category and/or a CAPC for each transmission starting point. For example, the multi-TTI grant may include separate indications (e.g., in separate fields) of an LBT category and/or a CAPC for each transmission starting point. Alternatively, the indication may indicate a first LBT category and/or a first CAPC to be used for a first set of transmission starting points and a second LBT category and/or a second CAPC to be used for a second set of transmission starting points, which may reduce signaling overhead.

In some aspects, an indication of one or more LBT parameters (e.g., an LBT category, a CAPC, and/or the like) may include a number of bits (e.g., a quantity of bits), and the base station 110 may indicate the number of bits that are included in the indication of the one or more LBT parameters. For example, the base station 110 may transmit, to the UE 120, a radio resource control (RRC) message that indicates the number of bits that will be included in the indication of the one or more LBT parameters (e.g., in a multi-TTI uplink grant or a single uplink grant). Additionally, or alternatively, the RRC message may indicate a mapping between a set of values of the bits and a corresponding set of LBT parameters (e.g., a first bit value corresponding to a first set of LBT parameters, such as a first LBT category and/or a first CAPC, a second bit value corresponding to a second set of LBT parameters, such as a second LBT category and/or a second CAPC, and so on). In this way, when the UE 120 receives a multi-TTI grant or a single uplink grant (e.g., a single-TTI grant), the UE 120 will be able to interpret the bits to identify the one or more LBT parameters to be used for each transmission starting point.

In some aspects, the number of bits included in the indication of the one or more LBT parameters and/or a mapping between values of the bits and a corresponding one or more LBT parameters may depend on a channel in which the uplink communication is transmitted. For example, different numbers of bits may be used for different channels (e.g., PUCCH, PUSCH, and/or the like), or different mappings between bit values and a corresponding one or more LBT parameters may be used for different channels. Additionally, or alternatively, the number of bits included in the indication of the one or more LBT parameters and/or a mapping between values of the bits and a corresponding one or more LBT parameters may depend on a type of cell (e.g., an FBE cell, an LBE cell, and/or the like) in which the uplink communication is transmitted. For example, different numbers of bits may be used for different types of cells, or different mappings between bit values and a corresponding one or more LBT parameters may be used for different types of cells. As another example, one or more bits to indicate the CAPC may be excluded from the indication for an FBE cell.

By receiving an indication of one or more LBT parameters to be used for multiple transmission starting points, a UE 120 may perform LBT appropriately for different transmission starting points. Furthermore, by mapping bit values to one or more LBT parameters, signaling overhead may be conserved, such as by mapping only LBT parameters supported by a UE 120 (e.g., according to a capability report transmitted by the UE 120 to the base station 110).

In some aspects, the UE 120 may modify the LBT category of one or more transmission starting points based at least in part on reception of a COT-SI. For example, the UE 120 may modify the LBT category of one or more transmission starting points from a first LBT category, indicated by the base station 110 for the one or more transmission starting points, to a second LBT category if the UE 120 determines that the one or more transmission starting points are within the channel occupancy duration (e.g., COT) acquired by the base station 110. The first LBT category may define a first channel sensing time that is longer than a second channel sensing time defined by the second LBT category. For example, the first LBT category may be Cat 4 LBT, and the second LBT category may be one of Cat 1 LBT (e.g., no LBT), 16 microsecond Cat 2 LBT, or 25 microsecond Cat 2 LBT. In another example, the first LBT category may be 25 microsecond Cat 2 LBT, and the second LBT category may one of Cat 1 LBT (e.g., no LBT) or 16 microsecond Cat 2 LBT. Alternatively, the first LBT category may define a first channel sensing time that is shorter than a second channel sensing time defined by the second LBT category, as described above. The UE 120 may determine the second LBT category based at least in part on information the UE 120 may receive within the COT-SI message or based at least in part on a pre-defined criteria. In some aspects, the second LBT category may be a 25 microsecond Cat 2 LBT. In some aspects, the second LBT category may be indicated within the COT-SI for the one or more transmission starting points. In some aspects, the second LBT category may be determined by the UE 120 based at least in part on a Slot Format Indicator (SFI) and/or other information included within the COT-SI.

In some aspects, the UE 120 may refrain from performing an LBT procedure for one or more transmission starting points, after performing an uplink transmission in a first transmission starting point which occurs prior to the one or more transmission starting points. For example, the UE 120 may refrain from performing an LBT procedure for the one or more transmission starting points if no transmission gap greater than a threshold (e.g., 16 microseconds) exists during a time from a first uplink transmission by the UE 120 in the first transmission starting point to a last uplink transmission by the UE 120 in the one or more transmission starting points. In another example, the UE 120 may be refrain from performing an LBT procedure for the one or more transmission starting points if a priority of a CAPC associated with the one or more transmission starting points is greater than or equal to a priority of a CAPC associated with the first transmission starting point. In another example, the UE 120 may refrain from performing the LBT procedure for the one or more transmission starting points if the LBT category associated with the one or more transmission starting points is the same as the LBT category associated with the first transmission starting point. In another example, the UE 120 may be required to perform a 16 microsecond Cat 2 LBT is there is a transmission gap equal to 16 microseconds before a transmission starting point within the one or more transmission starting points.

As indicated above, FIG. 5 is provided as an example. Other examples may differ from what is described with regard to FIG. 5.

Figure 6:
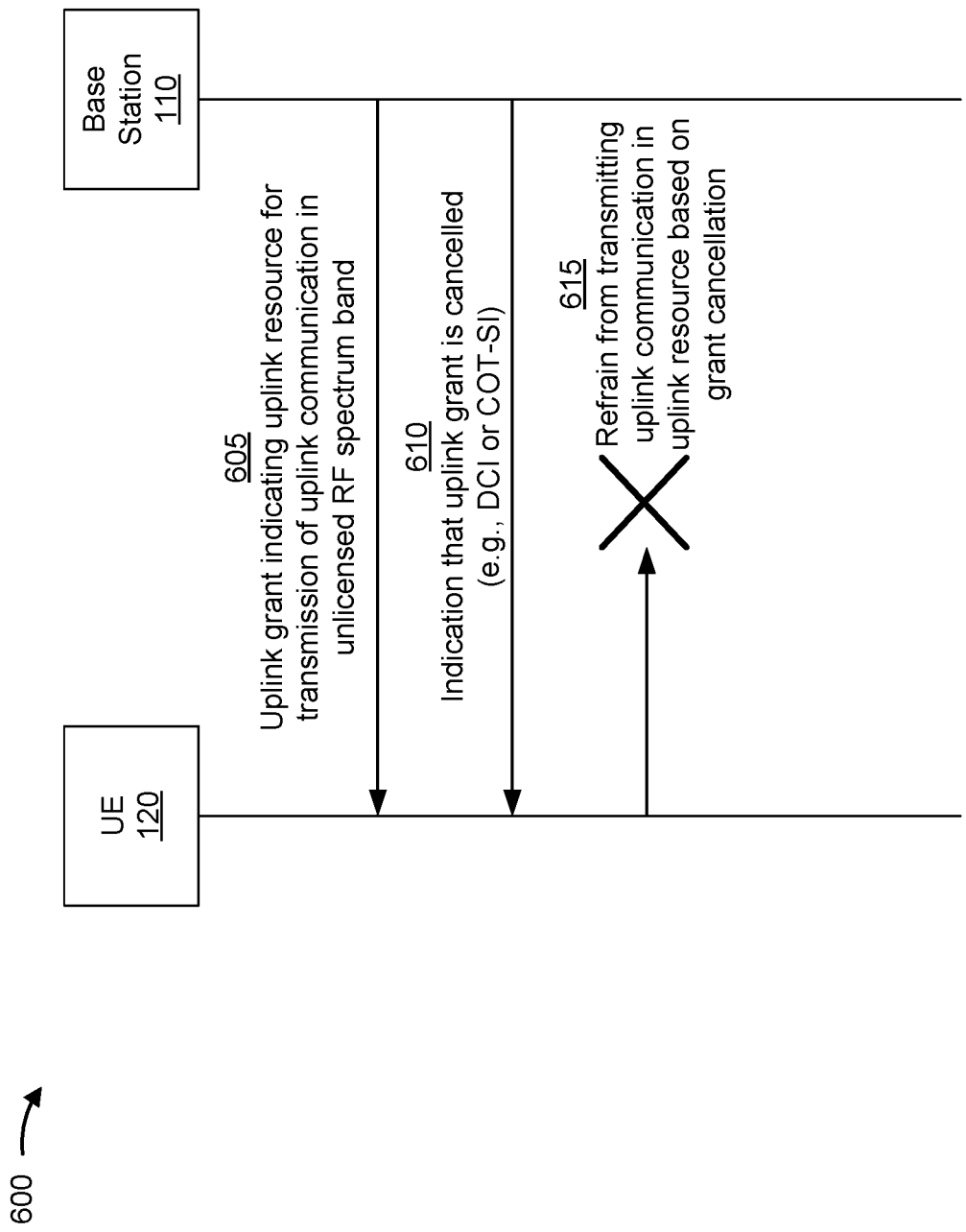

FIG. 6 is a diagram illustrating an example 600 of channel access procedures for an unlicensed radio frequency spectrum band, in accordance with various aspects of the present disclosure. As shown in FIG. 6, a base station 110 and a UE 120 may communicate with one another.

As shown by reference number 605, the base station 110 may transmit, and the UE 120 may receive, an uplink grant that indicates an uplink resource for transmission of an uplink communication in an unlicensed radio frequency spectrum band, in a similar manner as described elsewhere herein. In some aspects, the uplink grant may be transmitted in first DCI.

As shown by reference number 610, after transmission of the uplink grant, the base station 110 may transmit, and the UE 120 may receive, an indication that the uplink grant is canceled. In some aspects, the indication that the uplink grant is canceled may be transmitted in second DCI (e.g., that is transmitted after the first DCI). For example, the indication may be a pre-emption indication, transmitted in DCI, that identifies a set of uplink resources (e.g., time resources, frequency resources, spatial resources, and/or the like) that are not permitted to be used by the UE 120 for the uplink communication. In this case, the UE 120 may determine to refrain from transmitting the uplink communication based at least in part on a determination that the set of uplink resources identified in the pre-emption indication overlap partially or fully with the uplink resource indicated in the uplink grant.

In some aspects, the indication that the uplink grant is canceled may be transmitted in a COT-SI. The COT-SI may indicate a set of occupied sub-bands (e.g., that have been acquired by the base station 110 for a COT). In this case, the UE 120 may determine to refrain from transmitting the uplink communication based at least in part on a determination that one or more sub-bands of the uplink resource indicated in the uplink grant are not included in the set of occupied sub-bands indicated in the COT-SI.

As shown by reference number 615, the UE 120 may refrain from transmitting the uplink communication based at least in part on receiving the indication that the uplink grant is canceled. In some aspects, the base station 110 may transmit, and the UE 120 may receive, a subsequent COT-SI (e.g., which may be transmitted subsequent to the COT-SI and/or the DCI that indicates that the uplink grant is canceled) that includes an indication that an uplink communication, associated with a prior COT-SI, is permitted to be transmitted in a COT associated with the subsequent COT-SI. In this case, the UE 120 may transmit the uplink communication in the COT indicated by the subsequent COT-SI based at least in part on receiving the indication that the uplink communication is permitted to be transmitted in the COT associated with the subsequent COT-SI.

By permitting an uplink grant to be canceled, the base station 110 may be able to prioritize higher priority communications (e.g., URLLC data for a different UE 120) than an uplink communication scheduled for the UE 120 by the uplink grant. This may assist with satisfying QoS requirements while also reducing the likelihood of collision (e.g., by canceling the uplink communication from the UE 120 in favor of a high priority communication for another UE 120). Furthermore, this may cancel an LBT procedure that is likely to fail when the base station 110 acquires fewer resources and/or sub-bands than the resources and/or sub-bands granted to the UE 120 in the uplink grant, thereby conserving network resources and resources of the UE 120 (e.g., processing resources, memory resources, battery power, and/or the like).

As indicated above, FIG. 6 is provided as an example. Other examples may differ from what is described with regard to FIG. 6.

Figure 7:
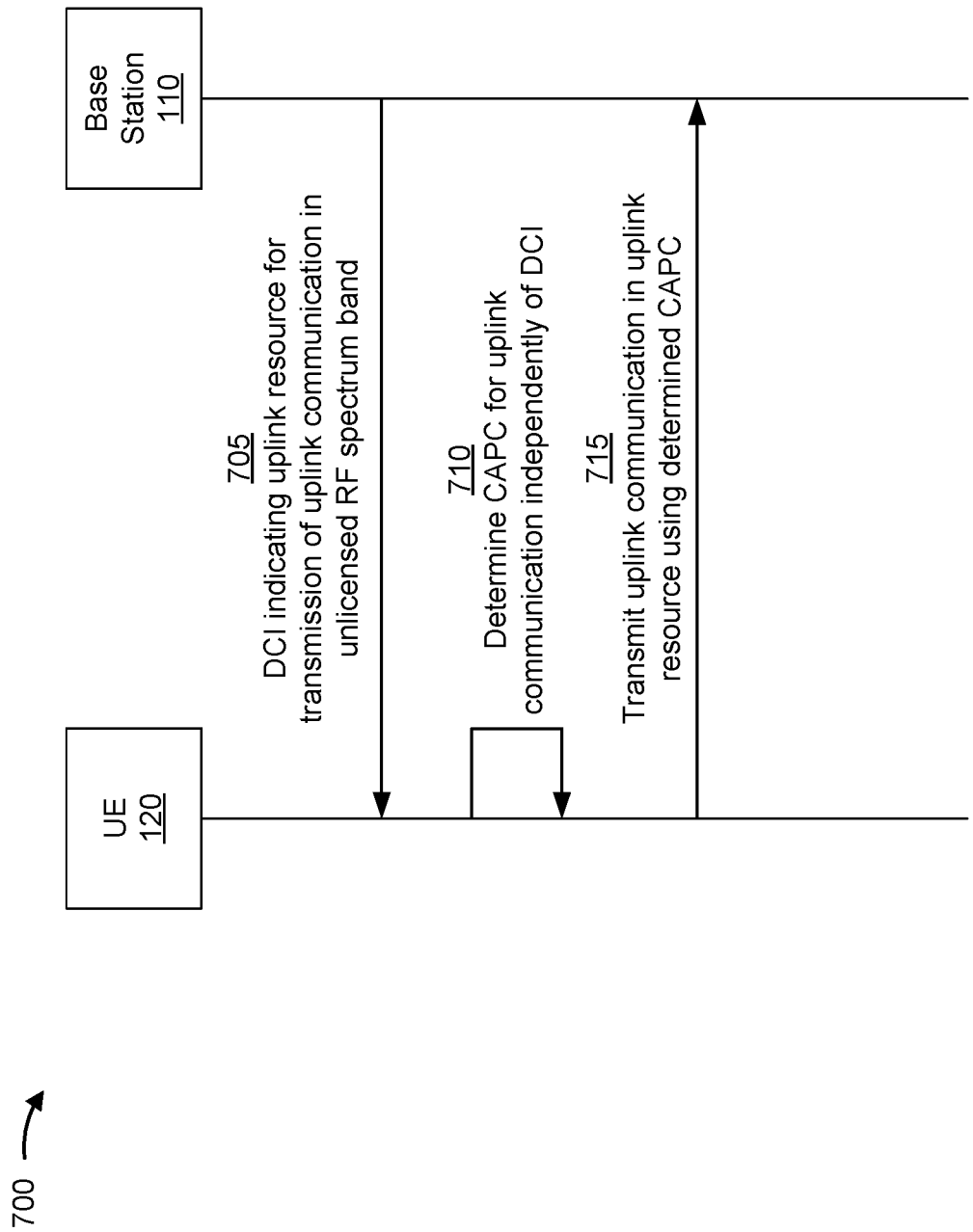

FIG. 7 is a diagram illustrating an example 700 of channel access procedures for an unlicensed radio frequency spectrum band, in accordance with various aspects of the present disclosure. As shown in FIG. 7, a base station 110 and a UE 120 may communicate with one another.

As shown by reference number 705, the base station 110 may transmit, and the UE 120 may receive, DCI that indicates an uplink resource for transmission of an uplink communication in an unlicensed radio frequency spectrum band, in a similar manner as descried elsewhere herein.

As shown by reference number 710, the UE 120 may determine a CAPC for the uplink communication independently of the DCI. For example, the UE 120 may determine a CAPC for the uplink communication regardless of a CAPC indicated in the DCI, may determine a CAPC for the uplink communication if the DCI does not indicate a CAPC to be used for the uplink communication, may determine a CAPC for the uplink communication if the DCI does not indicate a valid CAPC to be used for the uplink communication, and/or the like. In some aspects, the base station 110 may transmit an indication, to the UE 120, to instruct the UE 120 to determine the CAPC independently of the DCI. In some aspects, the UE 120 may determine a CAPC associated with uplink data to be transmitted by the UE 120 in the uplink communication (e.g., based at least in part on a priority of the uplink data, a logical channel associated with the uplink data, a CAPC configured for the logical channel, and/or the like), and may use that CAPC when transmitting the uplink communication.

In some aspects, the base station 110 may indicate a valid CAPC value (e.g., one of type 1 to type 4) to allow the base station 110 to share the channel occupancy initiated by the UE 120 for transmitting an uplink communication. In this case, the UE 120 may use the CAPC value indicated by the base station 110. In another example, the base station 110 may indicate an invalid CAPC value to allow the UE 120 to determine the CAPC autonomously for the uplink communication (e.g., using one or more techniques described above).

In some aspects, the base station 110 may indicate a CAPC for an uplink grant only if Cat 2 LBT is indicated for the uplink grant (e.g., only if the base station 110 determines and/or indicates that Cat 2 LBT is to be used for the uplink grant). Based at least in part on the indicated CAPC and the CAPC of the data included within the uplink grant, the UE 120 can determine whether to perform an uplink transmission. The base station 110 may not be required to indicate a CAPC (e.g., may refrain from indicating a CAPC) for an uplink grant if Cat 4 LBT is indicated for the uplink grant. In this case, the UE 120 may determine a CAPC for the uplink grant autonomously, as described above. In this case, the bits required to indicate the CAPC may be reserved (e.g., CAPC bits may be reserved if Cat 4 LBT indication is not jointly coded within the CAPC indication) or an invalid CAPC value may be indicated (e.g., CAPC bits may indicate an unused value if Cat 4 LBT indication is jointly coded within the CAPC indication).

In some aspects, if the determined CAPC is different than a signaled CAPC indicated in DCI, then the UE 120 may use the determined CAPC instead of the signaled CAPC. In this case, the determined CAPC may override the signaled CAPC. In some aspects, the UE 120 may use a higher priority CAPC of the determined CAPC and the signaled CAPC. In this case, if the determined CAPC is associated with a higher priority than the signaled CAPC, then the UE 120 may use the determined CAPC. Conversely, if the signaled CAPC is associated with a higher priority than the determined CAPC, then the UE 120 may use the signaled CAPC. Using a higher priority CAPC may reduce latency for communications.

Alternatively, the UE 120 may use a lower priority CAPC of the determined CAPC and the signaled CAPC. In this case, if the determined CAPC is associated with a lower priority than the signaled CAPC, then the UE 120 may use the determined CAPC. Conversely, if the signaled CAPC is associated with a lower priority than the determined CAPC, then the UE 120 may use the signaled CAPC. Using a lower priority CAPC may increase fairness in the unlicensed radio frequency spectrum band by permitting other devices to access the channel.

As shown by reference number 715, the UE 120 may transmit the uplink communication in the indicated uplink resource using the determined CAPC. For example, the UE 120 may perform an LBT procedure based at least in part on the determined CAPC (e.g., using one or more parameters defined by the CAPC when performing the LBT procedure). As described elsewhere herein, the UE 120 may perform the LBT procedure by sensing a channel for a channel sensing duration indicated by the CAPC. If the energy detected by the UE 120 on the channel satisfies a threshold (e.g., if the LBT procedure fails), then the UE 120 may refrain from transmitting the uplink communication on the channel. If the energy detected by the UE 120 on the channel does not satisfy a threshold (e.g., if the LBT procedure succeeds), then the UE 120 may transmit the uplink communication.

In some cases, the base station 110 may indicate a CAPC in DCI based at least in part on a buffer status report transmitted by the UE 120 to the base station 110. The buffer status report may indicate a type of data and/or a priority of data stored in the buffer of a UE 120, which may be used by the base station 110 for selection of a CAPC. However, in some cases, the data stored in the buffer of the UE 120 may change, and the base station 110 may select a CAPC that reflects a previous state of the buffer. In this case, by permitting the UE 120 to determine a CAPC independent of DCI and/or a base station 110 indication, the CAPC may more accurately reflect data stored in the buffer of the UE 120.

As indicated above, FIG. 7 is provided as an example. Other examples may differ from what is described with regard to FIG. 7.

Figure 8:
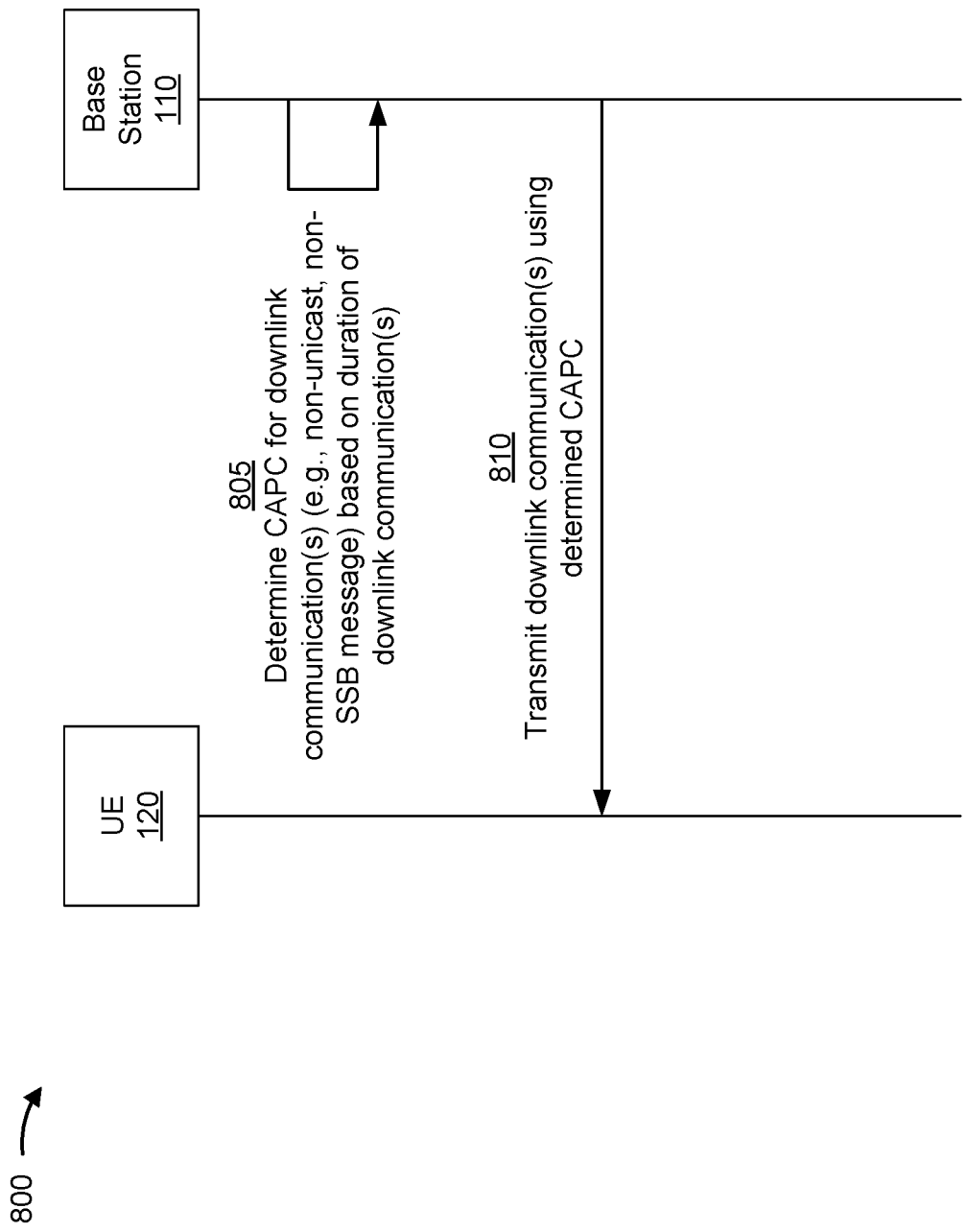

FIG. 8 is a diagram illustrating an example 800 of channel access procedures for an unlicensed radio frequency spectrum band, in accordance with various aspects of the present disclosure. As shown in FIG. 8, a base station 110 and a UE 120 may communicate with one another.

As shown by reference number 805, the base station 110 may determine a CAPC to be used for one or more downlink communications. In some aspects, the one or more downlink communications may be non-unicast messages (e.g., broadcast messages, multicast messages, group messages, and/or the like). Additionally, or alternatively, the one or more downlink communications may be downlink communications that are not transmitted in a synchronization signal block (SSB). In some aspects, the one or more downlink communications may include a paging message, a random access response message, a downlink random access message, and/or the like.

As further shown, the base station 110 may determine the CAPC based at least in part on a duration of the one or more downlink communications. In some aspects, the one or more downlink communications may include a physical downlink control channel (PDCCH) communication and/or a physical downlink shared channel (PDSCH) communication, which may be scheduled by the PDCCH communication. In this case, the duration may include a time period from a start of a PDCCH communication to an end of a corresponding PDSCH communication scheduled by the PDCCH communication.

In some aspects, the one or more downlink communications may include multiple communications (e.g., multiple PDSCH communications or messages), such as in a traffic burst. In this case, the duration may include a time period from the start of the multiple communications to the end of the multiple communications.

In some aspects, the base station 110 may select a CAPC that defines a maximum COT that is greater than or equal to the duration. For example, if the duration is two milliseconds or less, then the base station 110 may select a CAPC with a maximum COT of 2 milliseconds. In some aspects, the base station 110 may select a CAPC with a maximum COT that is closest to the duration and that is greater than or equal to the duration. In some aspects, the base station 110 may select a higher priority CAPC for a shorter duration, and may select a lower priority CAPC for a longer duration.

In some aspects, the base station 110 may always select the highest priority CAPC (e.g., from a set of supported CAPCs) for the one or more downlink communications. In some aspects, the base station 110 may always select the lowest priority CAPC (e.g., from a set of supported CAPCs) for the one or more downlink communications. In some aspects, when the one or more downlink communications (e.g., one or more downlink non-unicast messages) are multiplexed with other communications (e.g., other data), the base station 110 may select the lowest priority (or highest priority) CAPC from a set of CAPCs associated with the data to be multiplexed (e.g., a CAPC associated with a highest priority logical channel or a lowest priority logical channel).

As shown by reference number 810, the base station 110 may transmit the one or more downlink communications using the determined CAPC. In this way, the base station 110 may select a CAPC that aligns with a priority for the one or more downlink communications and/or a duration of the one or more downlink communications to avoid acquiring the channel for more time than is needed for transmission of the one or more downlink communications. In this way, the channel may be made available for other transmissions, thereby improving spectral efficiency.

As indicated above, FIG. 8 is provided as an example. Other examples may differ from what is described with regard to FIG. 8.

Figure 9:
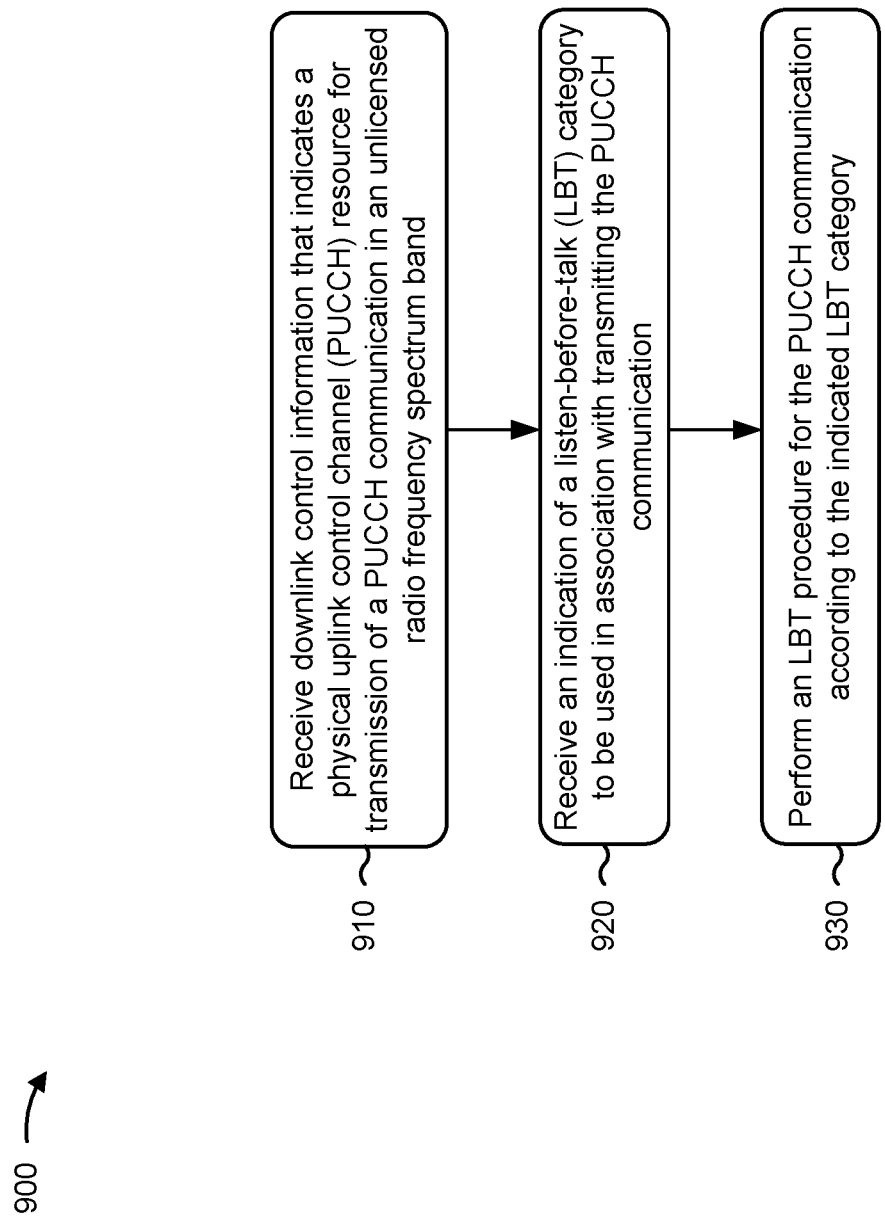
FIGS. 9-15 are diagrams illustrating example processes relating to channel access procedures for an unlicensed radio frequency spectrum band, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with channel access procedures for an unlicensed radio frequency spectrum band.

As shown in FIG. 9, in some aspects, process 900 may include receiving downlink control information that indicates a physical uplink control channel (PUCCH) resource for transmission of a PUCCH communication in an unlicensed radio frequency spectrum band (block 910). For example, the UE (e.g., using receive processor 258, controller/processor 280, memory 282, and/or the like) may receive downlink control information that indicates a PUCCH resource for transmission of a PUCCH communication in an unlicensed radio frequency spectrum band, as described above.

As further shown in FIG. 9, in some aspects, process 900 may include receiving an indication of a listen-before-talk (LBT) category to be used in association with transmitting the PUCCH communication (block 920). For example, the UE (e.g., using receive processor 258, controller/processor 280, memory 282, and/or the like) may receive an indication of an LBT category to be used in association with transmitting the PUCCH communication, as described above.

As further shown in FIG. 9, in some aspects, process 900 may include performing an LBT procedure for the PUCCH communication according to the indicated LBT category (block 930). For example, the UE (e.g., using receive processor 258, transmit processor 264, controller/processor 280, memory 282, and/or the like) may perform an LBT procedure for the PUCCH communication according to the indicated LBT category, as described above.

Process 900 may include additional aspects, such as any single aspect or any combination of aspects described below and/or in connection with one or more other processes described elsewhere herein.

In a first aspect, the LBT category is indicated by a channel occupancy time-structure indication (COT-SI).

In a second aspect, alone or in combination with the first aspect, the LBT category is indicated by whether the PUCCH resource is included in a channel occupancy time indicated in the COT-SI.

In a third aspect, alone or in combination with one or more of the first and second aspects, the LBT category is category 2 if the PUCCH resource is included in a channel occupancy time indicated in the COT-SI.

In a fourth aspect, alone or in combination with one or more of the first through third aspects, the LBT category is category 4 if the PUCCH resource is not included in a channel occupancy time indicated in the COT-SI.

In a fifth aspect, alone or in combination with one or more of the first through fourth aspects, the LBT category is indicated in the downlink control information.

In a sixth aspect, alone or in combination with one or more of the first through fifth aspects, the LBT category is implicitly indicated as a default LBT category based at least in part on the PUCCH communication being scheduled by the downlink control information.

In a seventh aspect, alone or in combination with one or more of the first through sixth aspects, the UE is configured to use category 2 LBT for any PUCCH communication scheduled in the unlicensed radio frequency spectrum band using DCI.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
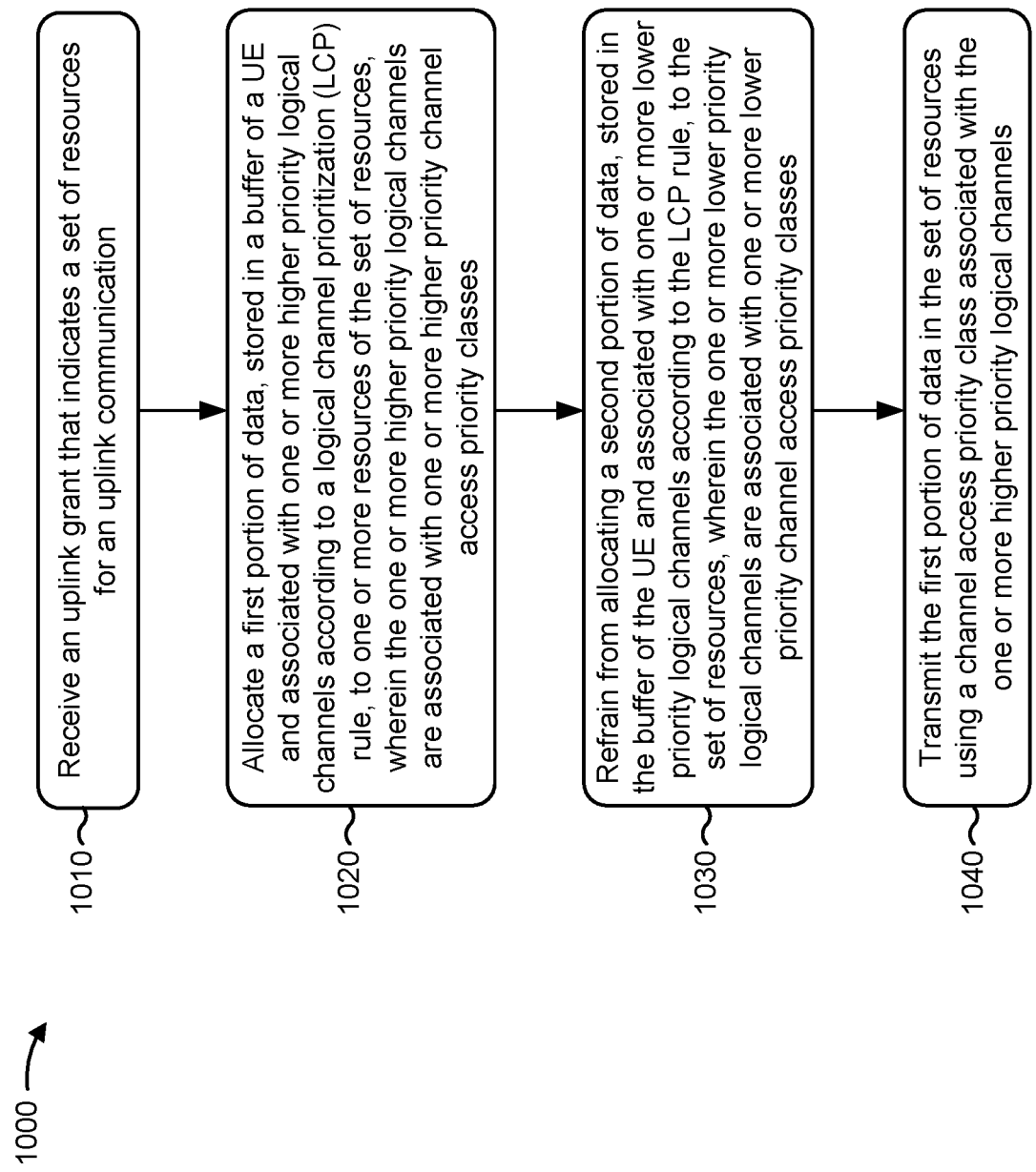

FIG. 10 is a diagram illustrating an example process 1000 performed, for example, by a UE, in accordance with various aspects of the present disclosure. Example process 1000 is an example where a UE (e.g., UE 120 and/or the like) performs operations associated with channel access procedures for an unlicensed radio frequency spectrum band.

As shown in FIG. 10, in some aspects, process 1000 may include receiving an uplink grant that indicates a set of resources for an uplink communication (block 1010). For example, the UE (e.g., using receive processor 258, controller/processor 280, memory 282, and/or the like) may receive an uplink grant that indicates a set of resources for an uplink communication, as described above.

As further shown in FIG. 10, in some aspects, process 1000 may include allocating a first portion of data, stored in a buffer of the UE and associated with one or more higher priority logical channels according to a logical channel prioritization (LCP) rule, to one or more resources of the set of resources, wherein the one or more higher priority logical channels are associated with one or more higher priority channel access priority classes (block 1020). For example, the UE (e.g., using transmit processor 264, controller/processor 280, memory 282, and/or the like) may allocate a first portion of data, stored in a buffer of the UE and associated with one or more higher priority logical channels according to an LCP rule, to one or more resources of the set of resources, as described above. In some aspects, the one or more higher priority logical channels are associated with one or more higher priority channel access priority classes.

As further shown in FIG. 10, in some aspects, process 1000 may include refraining from allocating a second portion of data, stored in the buffer of the UE and associated with one or more lower priority logical channels according to the LCP rule, to the set of resources, wherein the one or more lower priority logical channels are associated with one or more lower priority channel access priority classes (block 1030). For example, the UE (e.g., using transmit processor 264, controller/processor 280, memory 282, and/or the like) may refrain from allocating a second portion of data, stored in the buffer of the UE and associated with one or more lower priority logical channels according to the LCP rule, to the set of resources, as described above. In some aspects, the one or more lower priority logical channels are associated with one or more lower priority channel access priority classes.

As further shown in FIG. 10, in some aspects, process 1000 may include transmitting the first portion of data in the set of resources using a channel access priority class associated with the one or more higher priority logical channels (block 1040). For example, the UE (e.g., using transmit processor 264, controller/processor 280, memory 282, and/or the like) may transmit the first portion of data in the set of resources using a channel access priority class associated with the one or more higher priority logical channels, as described above.

Process 1000 may include additional aspects, such as any single aspect or any combination of aspects described below and/or in connection with one or more other processes described elsewhere herein.

In a first aspect, process 1000 includes interrupting an LCP procedure after allocating the first portion of data to the set of resources.

In a second aspect, alone or in combination with the first aspect, the one or more lower priority logical channels are associated with a lower priority channel access priority class than the channel access priority class used to transmit in the set of resources.

In a third aspect, alone or in combination with one or more of the first and second aspects, process 1000 includes transmitting a set of padding bits with the first portion of data to fill the set of resources.

In a fourth aspect, alone or in combination with one or more of the first through third aspects, process 1000 includes transmitting a buffer status report, with the first portion of data in the set of resources, to indicate that the UE has data stored in the buffer.

In a fifth aspect, alone or in combination with one or more of the first through fourth aspects, process 1000 includes transmitting an indication, with the first portion of data in the set of resources, to indicate that the UE has interrupted an LCP procedure.

In a sixth aspect, alone or in combination with one or more of the first through fifth aspects, process 1000 includes determining to allocate the first portion of data to the set of resources and to refrain from allocating the second portion of data to the set of resources based at least in part on at least one of: a determination that the first portion of data or a set of padding bits to be used to fill the set of resources satisfies a condition with respect to filling the set of resources with data, a determination that all data from the one or more higher priority logical channels has been allocated to the set of resources, a determination that a size of the second portion of data satisfies a condition that is based at least in part on the one or more lower priority logical channels, a determination that a contention window size associated with the one or more lower priority logical channels differs from a contention window size of the one or more higher priority logical channels by a threshold amount, a listen-before-talk category indicated by the uplink grant, an indication to activate an LCP restriction procedure, a determination that an interference level measured by the UE satisfies a threshold, or a combination thereof.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
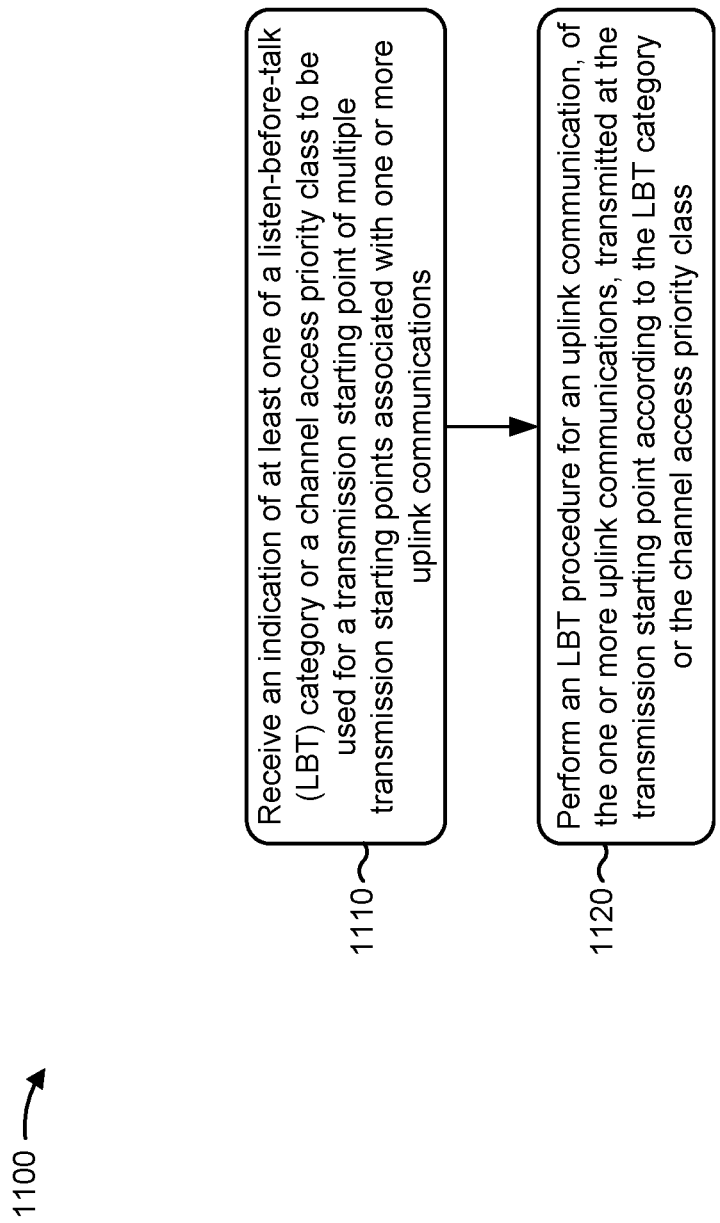

FIG. 11 is a diagram illustrating an example process 1100 performed, for example, by a UE, in accordance with various aspects of the present disclosure. Example process 1100 is an example where a UE (e.g., UE 120 and/or the like) performs operations associated with channel access procedures for an unlicensed radio frequency spectrum band.

As shown in FIG. 11, in some aspects, process 1100 may include receiving an indication of at least one of an LBT category or a channel access priority class to be used for a transmission starting point of multiple transmission starting points associated with one or more uplink communications (block 1110). For example, the UE (e.g., using receive processor 258, controller/processor 280, memory 282, and/or the like) may receive an indication of at least one of an LBT category or a channel access priority class to be used for a transmission starting point of multiple transmission starting points associated with one or more uplink communications, as described above.

As further shown in FIG. 11, in some aspects, process 1100 may include performing an LBT procedure for an uplink communication, of the one or more uplink communications, transmitted at the transmission starting point according to the LBT category or the channel access priority class (block 1120). For example, the UE (e.g., using receive processor 258, transmit processor 264, controller/processor 280, memory 282, and/or the like) may perform an LBT procedure for an uplink communication, of the one or more uplink communications, transmitted at the transmission starting point according to the LBT category or the channel access priority class, as described above.

Process 1100 may include additional aspects, such as any single aspect or any combination of aspects described below and/or in connection with one or more other processes described elsewhere herein.

In a first aspect, the indication is received in a multi-transmission time interval (multi-TTI) uplink grant that schedules the multiple transmission starting points for the one or more uplink communications.

In a second aspect, alone or in combination with the first aspect, the LBT category is a single LBT category that is used for all transmission starting points.

In a third aspect, alone or in combination with one or more of the first and second aspects, the LBT category is a first LBT category associated with a first channel sensing time that is used for an initial LBT procedure in an initial transmission starting point, the UE is configured to use a second LBT category associated with a second channel sensing time for a subsequent LBT procedure performed for a subsequent transmission starting point, and the second channel sensing time is longer than the first channel sensing time.

In a fourth aspect, alone or in combination with one or more of the first through third aspects, the first LBT category is no LBT and the second LBT category is either 16 microsecond category 2 LBT or 25 microsecond category 2 LBT.

In a fifth aspect, alone or in combination with one or more of the first through fourth aspects, the first LBT category is 16 microsecond category 2 LBT and the second LBT category is 25 microsecond category 2 LBT.

In a sixth aspect, alone or in combination with one or more of the first through fifth aspects, the indication includes a separate indication of an LBT category for each transmission starting point.

In a seventh aspect, alone or in combination with one or more of the first through sixth aspects, the indication indicates a first LBT category to be used for a first set of transmission starting points and a second LBT category to be used for a second set of transmission starting points.

In an eighth aspect, alone or in combination with one or more of the first through seventh aspects, the indication includes a number of bits, and the number of bits is indicated in a radio resource control message.

In a ninth aspect, alone or in combination with one or more of the first through eighth aspects, a mapping between a set of values of the bits and a corresponding set of LBT categories or channel access priority classes is indicated in the radio resource control message.

In a tenth aspect, alone or in combination with one or more of the first through ninth aspects, at least one of a number of bits included in the indication or a mapping between a set of values of the number of bits and a corresponding set of LBT categories or channel access priority classes is based at least in part on a channel in which the uplink communication is to be transmitted.

In an eleventh aspect, alone or in combination with one or more of the first through tenth aspects, at least one of a number of bits included in the indication or a mapping between a set of values of the number of bits and a corresponding set of LBT categories or channel access priority classes is based at least in part on a type of cell in which the uplink communication is to be transmitted.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
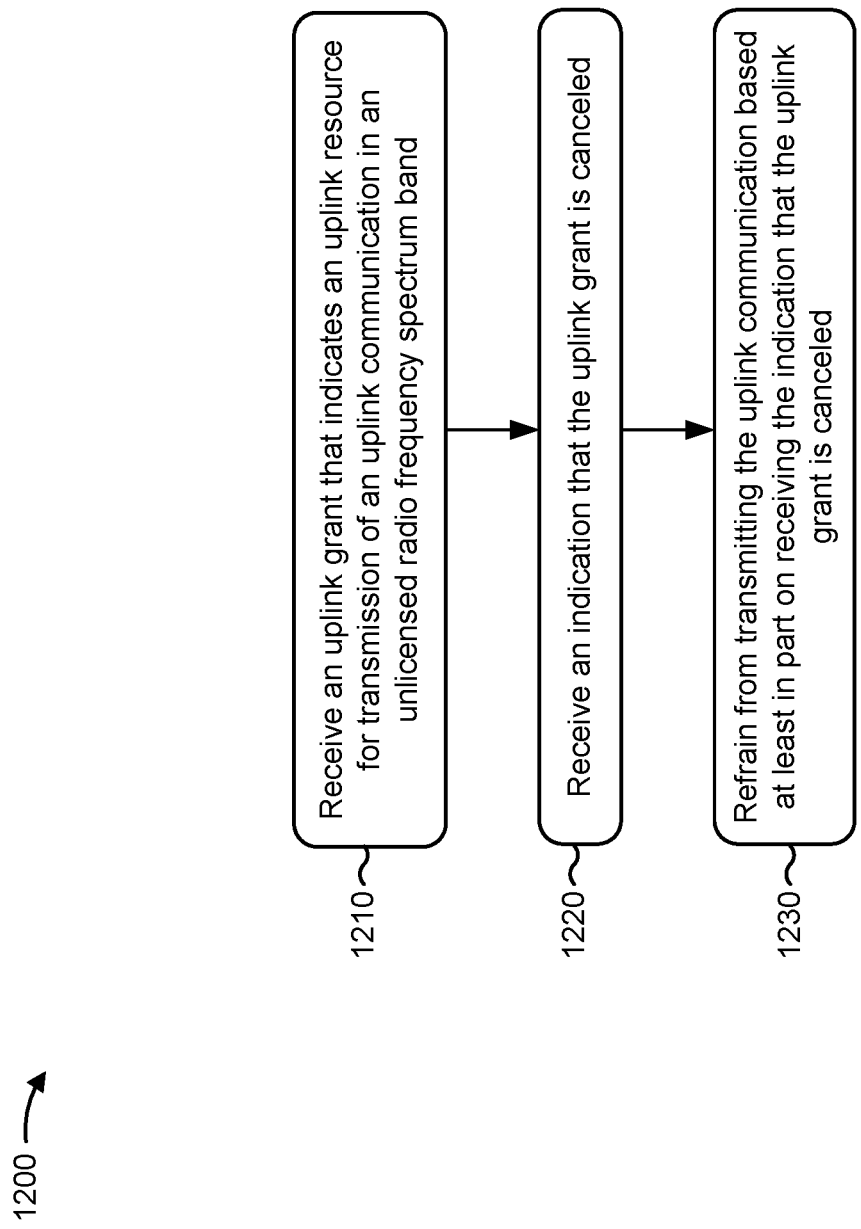

FIG. 12 is a diagram illustrating an example process 1200 performed, for example, by a UE, in accordance with various aspects of the present disclosure. Example process 1200 is an example where a UE (e.g., UE 120 and/or the like) performs operations associated with channel access procedures for an unlicensed radio frequency spectrum band.

As shown in FIG. 12, in some aspects, process 1200 may include receiving an uplink grant that indicates an uplink resource for transmission of an uplink communication in an unlicensed radio frequency spectrum band (block 1210). For example, the UE (e.g., using receive processor 258, controller/processor 280, memory 282, and/or the like) may receive an uplink grant that indicates an uplink resource for transmission of an uplink communication in an unlicensed radio frequency spectrum band, as described above.

As further shown in FIG. 12, in some aspects, process 1200 may include receiving an indication that the uplink grant is canceled (block 1220). For example, the UE (e.g., using receive processor 258, controller/processor 280, memory 282, and/or the like) may receive an indication that the uplink grant is canceled, as described above.

As further shown in FIG. 12, in some aspects, process 1200 may include refraining from transmitting the uplink communication based at least in part on receiving the indication that the uplink grant is canceled (block 1230). For example, the UE (e.g., using transmit processor 264, controller/processor 280, memory 282, and/or the like) may refrain from transmitting the uplink communication based at least in part on receiving the indication that the uplink grant is canceled, as described above.

Process 1200 may include additional aspects, such as any single aspect or any combination of aspects described below and/or in connection with one or more other processes described elsewhere herein.

In a first aspect, the indication is a pre-emption indication, transmitted in downlink control information, that identifies a set of uplink resources that are not permitted to be used by the UE for the uplink communication.

In a second aspect, alone or in combination with the first aspect, process 1200 includes determining to refrain from transmitting the uplink communication based at least in part on a determination that the set of uplink resources identified in the pre-emption indication overlap partially or fully with the uplink resource indicated in the uplink grant.

In a third aspect, alone or in combination with one or more of the first and second aspects, the indication is included in a channel occupancy time-structure indication (COT-SI) that indicates a set of occupied sub-bands.

In a fourth aspect, alone or in combination with one or more of the first through third aspects, process 1200 includes determining to refrain from transmitting the uplink communication based at least in part on a determination that one or more sub-bands of the uplink resource indicated in the uplink grant are not included in the set of occupied sub-bands indicated in the COT-SI.

In a fifth aspect, alone or in combination with one or more of the first through fourth aspects, process 1200 includes: receiving a COT-SI that includes an indication that the uplink communication, associated with a prior COT-SI, is permitted to be transmitted in a channel occupancy time associated with the COT-SI; and transmitting the uplink communication in the channel occupancy time based at least in part on receiving the indication that the uplink communication is permitted to be transmitted in the channel occupancy time associated with the COT-SI.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
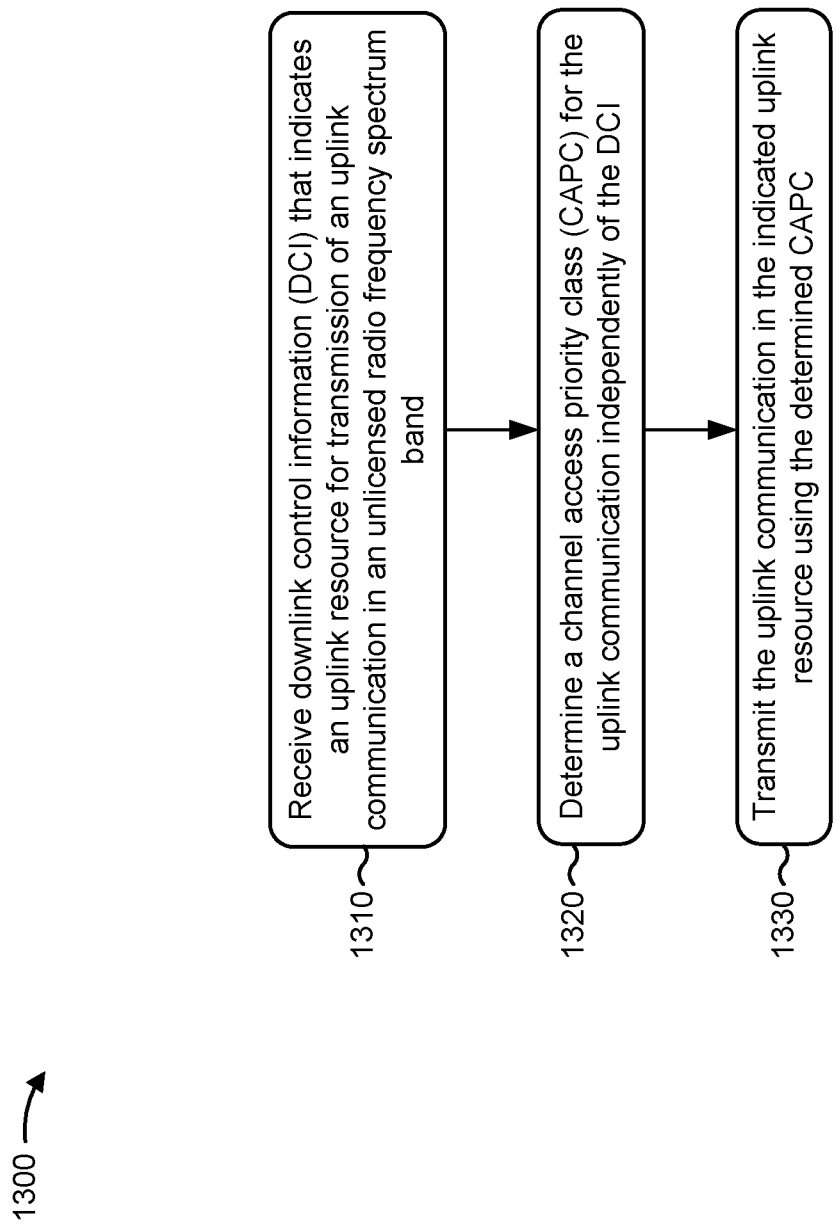

FIG. 13 is a diagram illustrating an example process 1300 performed, for example, by a UE, in accordance with various aspects of the present disclosure. Example process 1300 is an example where a UE (e.g., UE 120 and/or the like) performs operations associated with channel access procedures for an unlicensed radio frequency spectrum band.

As shown in FIG. 13, in some aspects, process 1300 may include receiving downlink control information (DCI) that indicates an uplink resource for transmission of an uplink communication in an unlicensed radio frequency spectrum band (block 1310). For example, the UE (e.g., using receive processor 258, controller/processor 280, memory 282, and/or the like) may receive DCI that indicates an uplink resource for transmission of an uplink communication in an unlicensed radio frequency spectrum band, as described above.

As further shown in FIG. 13, in some aspects, process 1300 may include determining a channel access priority class (CAPC) for the uplink communication independently of the DCI (block 1320). For example, the UE (e.g., using controller/processor 280, memory 282, and/or the like) may determine a channel access priority class (CAPC) for the uplink communication independently of the DCI, as described above.

As further shown in FIG. 13, in some aspects, process 1300 may include transmitting the uplink communication in the indicated uplink resource using the determined CAPC (block 1330). For example, the UE (e.g., using transmit processor 264, controller/processor 280, memory 282, and/or the like) may transmit the uplink communication in the indicated uplink resource using the determined CAPC, as described above.

Process 1300 may include additional aspects, such as any single aspect or any combination of aspects described below and/or in connection with one or more other processes described elsewhere herein.

In a first aspect, the CAPC is determined based at least in part on a CAPC associated with uplink data to be transmitted in the uplink communication.

In a second aspect, alone or in combination with the first aspect, the DCI indicates a first CAPC and the determined CAPC is a second CAPC that overrides the first CAPC.

In a third aspect, alone or in combination with one or more of the first and second aspects, the second CAPC is associated with a higher priority than the first CAPC, and the UE uses the second CAPC based at least in part on a determination that a CAPC associated with uplink data to be transmitted in the uplink communication is associated with a higher priority than the first CAPC.

In a fourth aspect, alone or in combination with one or more of the first through third aspects, the second CAPC is associated with a lower priority than the first CAPC, and the UE uses the second CAPC based at least in part on a determination that a CAPC associated with uplink data to be transmitted in the uplink communication is associated with a lower priority than the first CAPC.

In a fifth aspect, alone or in combination with one or more of the first through fourth aspects, the CAPC for the uplink communication is determined independently of the DCI based at least in part on an indication, from a base station, that the UE is to determine the CAPC independently of the DCI.

In a sixth aspect, alone or in combination with one or more of the first through fifth aspects, the DCI does not indicate a valid CAPC to be used for the uplink communication.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
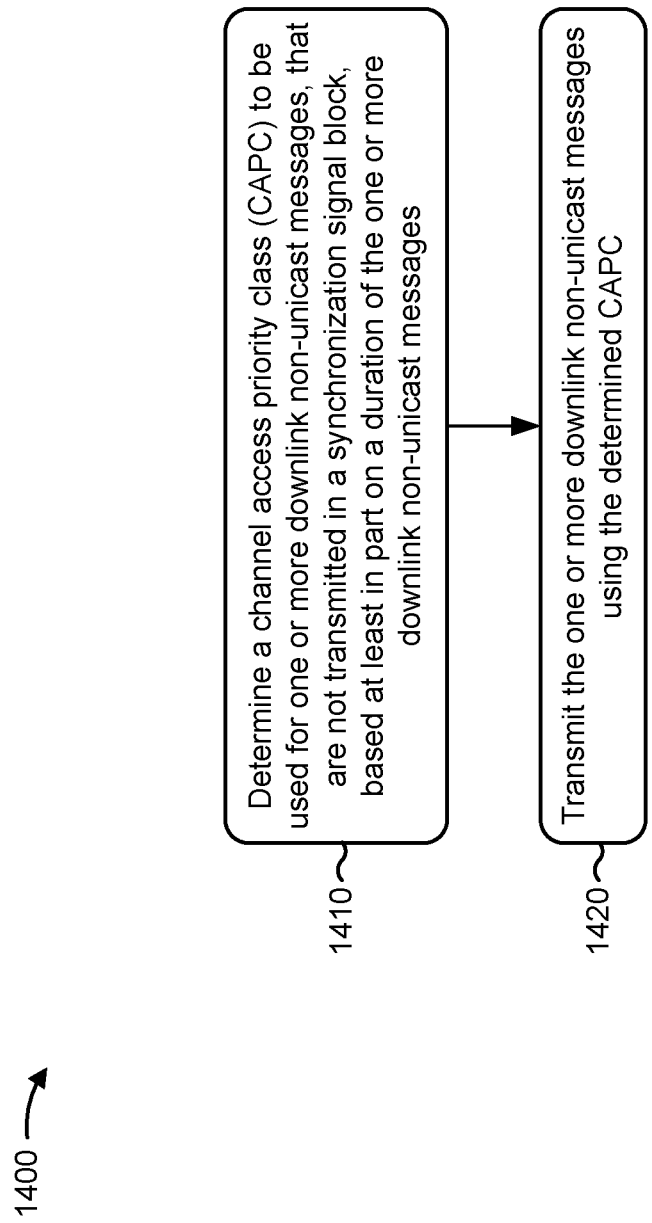

FIG. 14 is a diagram illustrating an example process 1400 performed, for example, by a base station, in accordance with various aspects of the present disclosure. Example process 1400 is an example where a base station (e.g., base station 110 and/or the like) performs operations associated with channel access procedures for an unlicensed radio frequency spectrum band.

As shown in FIG. 14, in some aspects, process 1400 may include determining a channel access priority class (CAPC) to be used for one or more downlink non-unicast messages, that are not transmitted in a synchronization signal block, based at least in part on a duration of the one or more downlink non-unicast messages (block 1410). For example, the base station (e.g., using controller/processor 240, memory 242, and/or the like) may determine a channel access priority class (CAPC) to be used for one or more downlink non-unicast messages, that are not transmitted in a synchronization signal block, based at least in part on a duration of the one or more downlink non-unicast messages, as described above.

As further shown in FIG. 14, in some aspects, process 1400 may include transmitting the one or more downlink non-unicast messages using the determined CAPC (block 1420). For example, the base station (e.g., using transmit processor 220, controller/processor 240, memory 242, and/or the like) may transmit the one or more downlink non-unicast messages using the determined CAPC, as described above.

Process 1400 may include additional aspects, such as any single aspect or any combination of aspects described below and/or in connection with one or more other processes described elsewhere herein.

In a first aspect, the duration includes a time period from a start of a physical downlink control channel (PDCCH) communication to an end of a corresponding physical downlink shared channel (PDSCH) communication scheduled by the PDCCH communication.

In a second aspect, alone or in combination with the first aspect, the one or more downlink non-unicast messages include multiple messages, and the duration includes a time period from a start of the multiple messages to an end of the multiple messages.

In a third aspect, alone or in combination with one or more of the first and second aspects, a higher priority CAPC is determined for a shorter duration of the one or more downlink non-unicast messages, and a lower priority CAPC is determined for a longer duration of the one or more downlink non-unicast messages.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
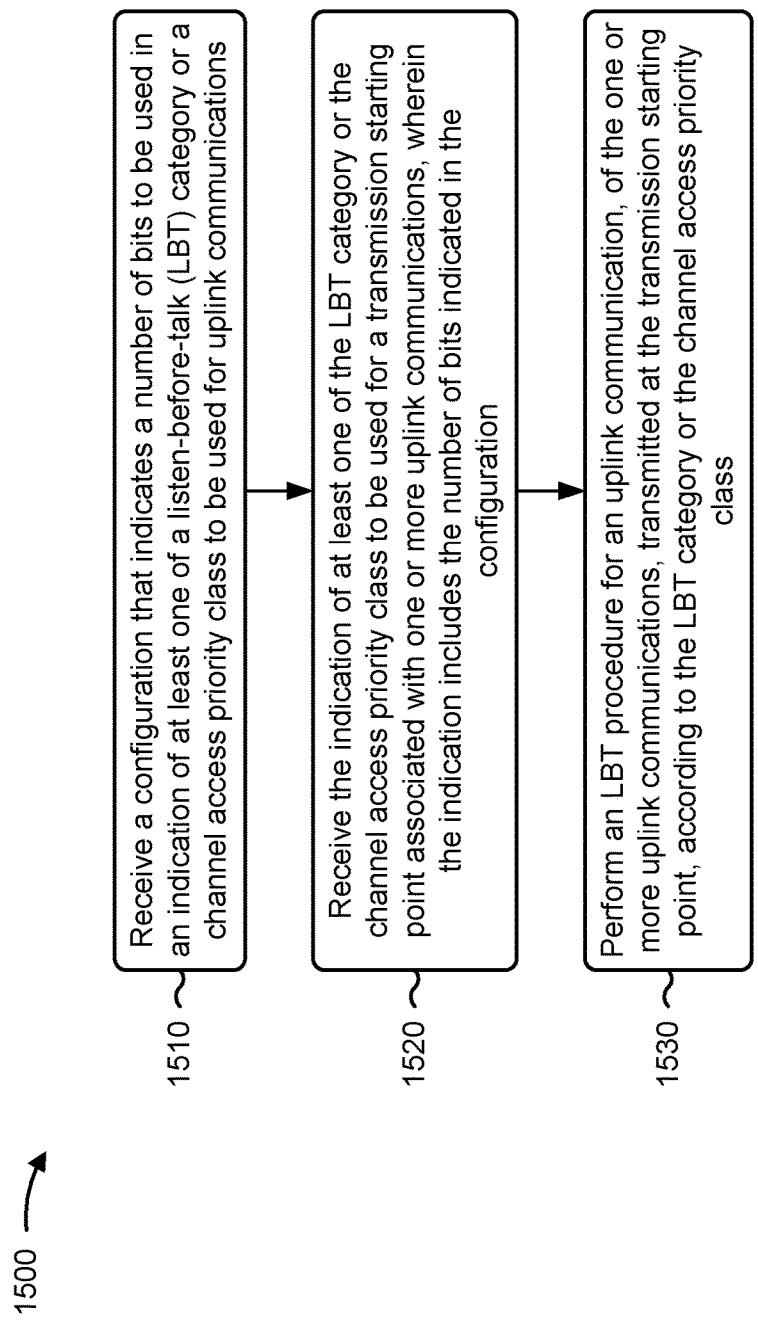

FIG. 15 is a diagram illustrating an example process 1500 performed, for example, by a UE, in accordance with various aspects of the present disclosure. Example process 1500 is an example where the UE (e.g., UE 120) performs operations associated with channel access procedures for an unlicensed radio frequency spectrum band.

As shown in FIG. 15, in some aspects, process 1500 may include receiving a configuration that indicates a number of bits to be used in an indication of at least one of an LBT category or a channel access priority class to be used for uplink communications (block 1510). For example, the UE (e.g., using antenna 252, demodulator 254, MIMO detector 256, receive processor 258, controller/processor 280, and/or memory 282) may receive a configuration that indicates a number of bits to be used in an indication of at least one of an LBT category or a channel access priority class to be used for uplink communications, as described above.

As further shown in FIG. 15, in some aspects, process 1500 may include receiving the indication of at least one of the LBT category or the channel access priority class to be used for a transmission starting point associated with one or more uplink communications, wherein the indication includes the number of bits indicated in the configuration (block 1520). For example, the UE (e.g., using antenna 252, demodulator 254, MIMO detector 256, receive processor 258, controller/processor 280, and/or memory 282) may receive the indication of at least one of the LBT category or the channel access priority class to be used for a transmission starting point associated with one or more uplink communications, wherein the indication includes the number of bits indicated in the configuration, as described above.

As further shown in FIG. 15, in some aspects, process 1500 may include performing an LBT procedure for an uplink communication, of the one or more uplink communications, transmitted at the transmission starting point, according to the LBT category or the channel access priority class (block 1530). For example, the UE (e.g., using antenna 252, demodulator 254, MIMO detector 256, receive processor 258, transmit processor 264, TX MIMO processor 266, modulator 254, controller/processor 280, and/or memory 282) may perform an LBT procedure for an uplink communication, of the one or more uplink communications, transmitted at the transmission starting point, according to the LBT category or the channel access priority class, as described above.

Process 1500 may include additional aspects, such as any single aspect or any combination of aspects described below and/or in connection with one or more other processes described elsewhere herein.

In a first aspect, the configuration indicates a mapping between a set of values of the bits and a corresponding set of LBT categories or channel access priority classes.

In a second aspect, alone or in combination with the first aspect, the configuration is included in a radio resource control message.

In a third aspect, alone or in combination with one or more of the first and second aspects, the transmission starting point is one of multiple transmission starting points associated with the one or more uplink communications.

In a fourth aspect, alone or in combination with one or more of the first through third aspects, the indication is received in a multi-transmission time interval (multi-TTI) uplink grant that schedules the multiple transmission starting points for the one or more uplink communications.

In a fifth aspect, alone or in combination with one or more of the first through fourth aspects, the LBT category is a single LBT category that is used for all transmission starting points indicated in the multi-TTI uplink grant.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, via a first message, a configuration that indicates a number of bits to be used in an indication of at least one of a listen-before-talk (LBT) category or a channel access priority class to be used for uplink communications;
   receiving, via a second message that is different from the first message, the indication of at least one of the LBT category or the channel access priority class to be used for a transmission starting point associated with one or more uplink communications, wherein the indication includes the number of bits indicated in the configuration; and
   performing an LBT procedure for an uplink communication, of the one or more uplink communications, transmitted at the transmission starting point, according to the LBT category or the channel access priority class.

2. The method of claim 1, wherein the configuration indicates a mapping between a set of values of the bits and a corresponding set of LBT categories or channel access priority classes.

3. The method of claim 1, wherein the first message comprises a radio resource control message.

4. The method of claim 1, wherein the transmission starting point is one of multiple transmission starting points associated with the one or more uplink communications.

5. The method of claim 4, wherein the indication is received in a multi-transmission time interval (multi-TTI) uplink grant that schedules the multiple transmission starting points for the one or more uplink communications.

6. The method of claim 5, wherein the LBT category is a single LBT category that is used for all transmission starting points indicated in the multi-TTI uplink grant.

7. A method of wireless communication performed by a user equipment (UE), comprising:
   receiving, via a first message, an indication of at least one of a listen-before-talk (LBT) category or a channel access priority class to be used for a transmission starting point of multiple transmission starting points associated with one or more uplink communications, wherein the indication includes a number of bits, and wherein the number of bits is indicated in a second message that is different from the first message; and
   performing an LBT procedure for an uplink communication, of the one or more uplink communications, transmitted at the transmission starting point according to the LBT category or the channel access priority class.

8. The method of claim 7, wherein the indication is received in a multi-transmission time interval (multi-TTI) uplink grant that schedules the multiple transmission starting points for the one or more uplink communications.

9. The method of claim 7, wherein the LBT category is a single LBT category that is used for all transmission starting points.

10. The method of claim 7, wherein the second message comprises a radio resource control message.

11. The method of claim 10, wherein a mapping between a set of values of the bits and a corresponding set of LBT categories or channel access priority classes is indicated in the radio resource control message.

12. The method of claim 7, wherein the LBT category is a first LBT category associated with a first channel sensing time that is used for an initial LBT procedure in an initial transmission starting point, and wherein the UE is configured to use a second LBT category associated with a second channel sensing time for a subsequent LBT procedure performed for a subsequent transmission starting point, wherein the second channel sensing time is longer than the first channel sensing time.

13. The method of claim 12, wherein the first LBT category is no LBT and the second LBT category is either 16 microsecond category 2 LBT or 25 microsecond category 2 LBT.

14. The method of claim 12, wherein the first LBT category is 16 microsecond category 2 LBT and the second LBT category is 25 microsecond category 2 LBT.

15. The method of claim 7, wherein the indication includes a separate indication of an LBT category for each transmission starting point.

16. The method of claim 7, wherein the indication indicates a first LBT category to be used for a first set of transmission starting points and a second LBT category to be used for a second set of transmission starting points.

17. The method of claim 7, wherein at least one of a number of bits included in the indication or a mapping between a set of values of the number of bits and a corresponding set of LBT categories or channel access priority classes is based at least in part on a channel in which the uplink communication is to be transmitted.

18. The method of claim 7, wherein at least one of a number of bits included in the indication or a mapping between a set of values of the number of bits and a corresponding set of LBT categories or channel access priority classes is based at least in part on a type of cell in which the uplink communication is to be transmitted.

19. A user equipment (UE) for wireless communication, comprising:
a memory; and
one or more processors, coupled to the memory, configured to:
receive, via a first message, a configuration that indicates a number of bits to be used in an indication of at least one of a listen-before-talk (LBT) category or a channel access priority class to be used for uplink communications;
receive, via a second message that is different from the first message, the indication of at least one of the LBT category or the channel access priority class to be used for a transmission starting point associated with one or more uplink communications, wherein the indication includes the number of bits indicated in the configuration; and
perform an LBT procedure for an uplink communication, of the one or more uplink communications, transmitted at the transmission starting point, according to the LBT category or the channel access priority class.

20. The UE of claim 19, wherein the configuration indicates a mapping between a set of values of the bits and a corresponding set of LBT categories or channel access priority classes.

21. The UE of claim 19, wherein the first message comprises a radio resource control message.

22. The UE of claim 19, wherein the transmission starting point is one of multiple transmission starting points associated with the one or more uplink communications.

23. The UE of claim 22, wherein the indication is received in a multi-transmission time interval (multi-TTI) uplink grant that schedules the multiple transmission starting points for the one or more uplink communications.

24. The UE of claim 23, wherein the LBT category is a single LBT category that is used for all transmission starting points indicated in the multi-TTI uplink grant.

25. A UE for wireless communication, comprising:
a memory; and
one or more processors, coupled to the memory, configured to:
receive, via a first message, an indication of at least one of a listen-before-talk (LBT) category or a channel access priority class to be used for a transmission starting point of multiple transmission starting points associated with one or more uplink communications, wherein the indication includes a number of bits, and wherein the number of bits is indicated in a second message that is different from the first message; and
perform an LBT procedure for an uplink communication, of the one or more uplink communications, transmitted at the transmission starting point according to the LBT category or the channel access priority class.

26. The UE of claim 25, wherein the indication is received in a multi-transmission time interval (multi-TTI) uplink grant that schedules the multiple transmission starting points for the one or more uplink communications.

27. The UE of claim 25, wherein the LBT category is a single LBT category that is used for all transmission starting points.

28. The UE of claim 25, wherein the second message comprises a radio resource control message.

29. The UE of claim 28, wherein a mapping between a set of values of the bits and a corresponding set of LBT categories or channel access priority classes is indicated in the radio resource control message.

30. The UE of claim 25, wherein the LBT category is a first LBT category associated with a first channel sensing time that is used for an initial LBT procedure in an initial transmission starting point, and wherein the UE is configured to use a second LBT category associated with a second channel sensing time for a subsequent LBT procedure performed for a subsequent transmission starting point, wherein the second channel sensing time is longer than the first channel sensing time.

* * * * *